US009517636B2

(12) United States Patent
Suhara et al.

(10) Patent No.: US 9,517,636 B2
(45) Date of Patent: *Dec. 13, 2016

(54) IMAGE FORMING METHOD, IMAGE FORMING APPARATUS, AND PRINT MATERIAL PRODUCTION METHOD TO FORM AN ELECTROSTATIC LATENT IMAGE BY SELECTIVE LIGHT POWER EXPOSURE

(71) Applicant: RICOH COMPANY, LTD., Tokyo (JP)

(72) Inventors: Hiroyuki Suhara, Kanagawa (JP); Masato Iio, Kanagawa (JP); Hiroto Tachibana, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,423

(22) Filed: May 6, 2015

(65) Prior Publication Data

US 2015/0331351 A1 Nov. 19, 2015

(30) Foreign Application Priority Data

May 13, 2014 (JP) ................................. 2014-099690

(51) Int. Cl.
*B41J 2/385* (2006.01)
*G03G 15/043* (2006.01)
*H04N 1/00* (2006.01)

(52) U.S. Cl.
CPC ............ *B41J 2/385* (2013.01); *G03G 15/043* (2013.01); *H04N 1/00* (2013.01); *G03G 2215/0431* (2013.01); *G03G 2215/0482* (2013.01)

(58) Field of Classification Search
CPC ........................... G03G 15/043; G03G 15/041
(Continued)

(56) References Cited

U.S. PATENT DOCUMENTS 5,546,111 A * 8/1996 Maeda ............... G06K 15/1223
347/144
5,834,766 A 11/1998 Suhara
(Continued)

FOREIGN PATENT DOCUMENTS

JP 2000-043315 2/2000
JP 2005-193540 7/2005
(Continued)

OTHER PUBLICATIONS

U.S. Appl. No. 14/564,466, filed Dec. 9, 2014.

*Primary Examiner* — Geoffrey Mruk
(74) *Attorney, Agent, or Firm* — Oblon, McClelland, Maier & Neustadt, L.L.P.

(57) ABSTRACT

An image forming method forms an electrostatic latent image corresponding to an image pattern including an image portion and a non-image portion by exposing a surface of an image bearer with light according to the image pattern. The image portion includes a plurality of pixels. Among the pixels constituting the image portion, at least a group of pixels existing at a boundary with respect to the non-image portion is set as a non-exposure pixel group. Among the pixels constituting the image portion, at least a group of pixels existing at a boundary with respect to the non-exposure pixel group is set as a high power exposure pixel group where exposure is performed with light of a higher light power value than a predetermined light power value required for exposing the image portion.

11 Claims, 30 Drawing Sheets

(58) Field of Classification Search
USPC ............... 347/118, 131, 132, 135, 143, 144, 236,347/237, 240, 246, 247, 251–254
See application file for complete search history.

(56) References Cited

U.S. PATENT DOCUMENTS

| | | | |
|---|---|---|---|
| 6,081,386 | A | 6/2000 | Hayashi et al. |
| 6,376,837 | B1 | 4/2002 | Itabashi et al. |
| 6,400,391 | B1 | 6/2002 | Suhara et al. |
| 6,555,810 | B1 | 4/2003 | Suhara |
| 6,870,652 | B2 | 3/2005 | Suhara et al. |
| 8,143,603 | B2 | 3/2012 | Suhara et al. |
| 8,982,422 | B2 * | 3/2015 | Iwata ................ H04N 1/40037 347/135 |
| 2001/0048542 | A1 | 12/2001 | Suhara |
| 2002/0080428 | A1 | 6/2002 | Suzuki et al. |
| 2002/0163571 | A1 | 11/2002 | Suhara et al. |
| 2003/0063358 | A1 | 4/2003 | Suhara |
| 2004/0179255 | A1 | 9/2004 | Suhara |
| 2004/0208674 | A1 | 10/2004 | Ilo et al. |
| 2005/0128615 | A1 | 6/2005 | Suhara et al. |
| 2005/0179971 | A1 | 8/2005 | Amada et al. |
| 2006/0262417 | A1 | 11/2006 | Suhara |
| 2008/0056746 | A1 | 3/2008 | Suhara |
| 2008/0170282 | A1 | 7/2008 | Amada et al. |
| 2009/0051982 | A1 | 2/2009 | Suhara |
| 2009/0220256 | A1 | 9/2009 | Suhara et al. |
| 2010/0054829 | A1 | 3/2010 | Iio et al. |
| 2010/0196052 | A1 | 8/2010 | Suhara |
| 2011/0223527 | A1 | 9/2011 | Iio et al. |
| 2012/0082829 | A1 | 4/2012 | Iio et al. |
| 2012/0243890 | A1 | 9/2012 | Iio et al. |
| 2014/0253658 | A1 | 9/2014 | Suhara et al. |
| 2014/0255069 | A1 | 9/2014 | Iio et al. |
| 2015/0042740 | A1 | 2/2015 | Suhara et al. |
| 2015/0177638 | A1 * | 6/2015 | Suhara ................ G03G 15/043 399/177 |
| 2016/0070195 | A1 * | 3/2016 | Tachibana ............ G03G 15/043 347/118 |

FOREIGN PATENT DOCUMENTS

| | | |
|---|---|---|
| JP | 2006-344436 | 12/2006 |
| JP | 2007-006392 | 1/2007 |
| JP | 2007-190787 | 8/2007 |
| JP | 2009-222754 | 10/2009 |
| JP | 2014-175738 | 9/2014 |
| JP | 2015-033779 | 2/2015 |

* cited by examiner

FIG.21
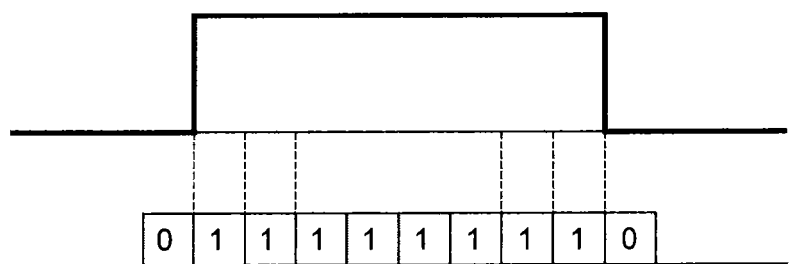
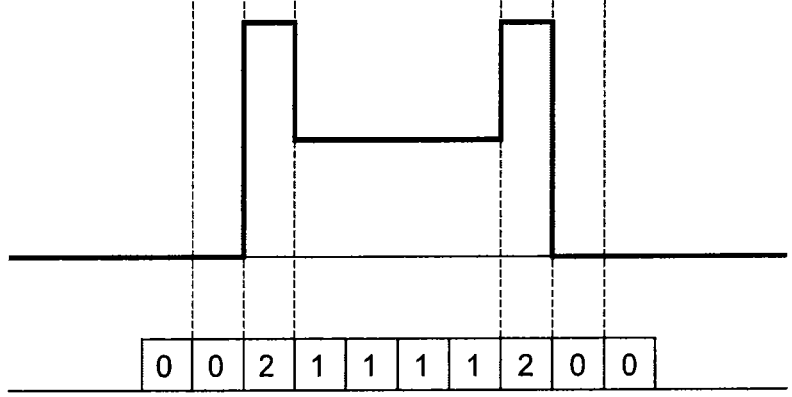
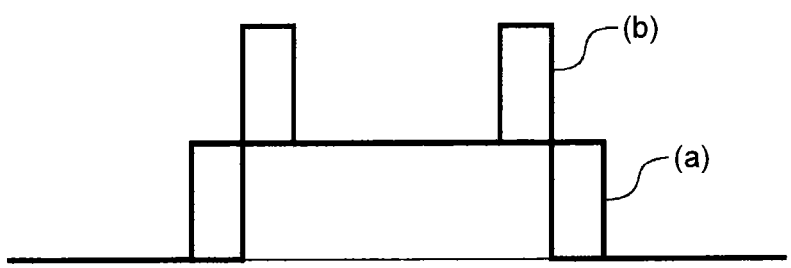

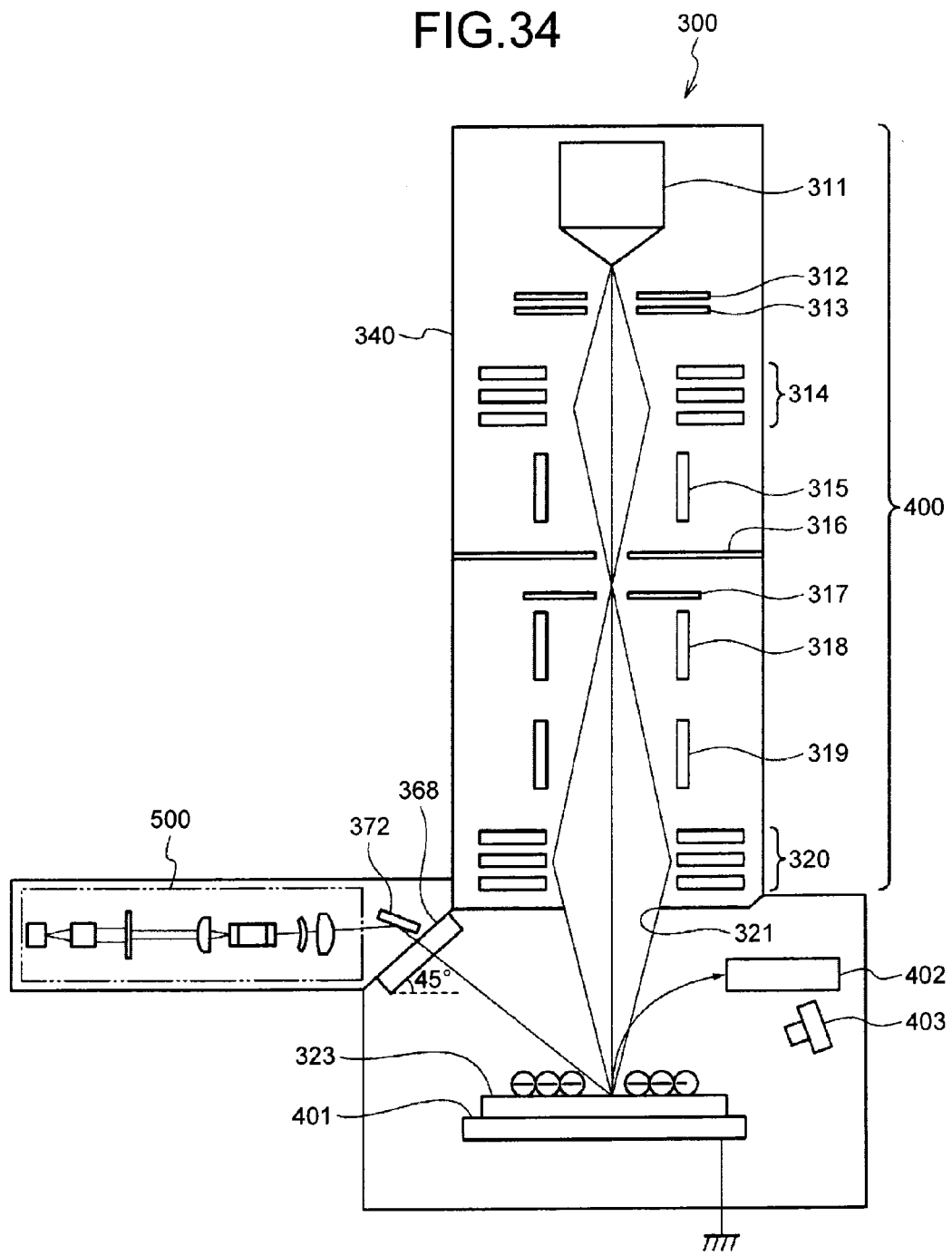
FIG. 34
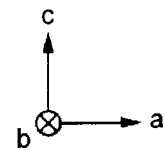

IMAGE FORMING METHOD, IMAGE FORMING APPARATUS, AND PRINT
MATERIAL PRODUCTION METHOD TO
FORM AN ELECTROSTATIC LATENT
IMAGE BY SELECTIVE LIGHT POWER
EXPOSURE

CROSS-REFERENCE TO RELATED APPLICATION

The present application claims priority to and incorporates by reference the entire contents of Japanese Patent Application No. 2014-099690 filed in Japan on May 13, 2014.

BACKGROUND OF THE INVENTION

1. Field of the Invention

The present invention relates to an image forming method and an image forming apparatus.

2. Description of the Related Art

In recent years, in an electrophotography process for forming images, demands for high image quality and high stabilization have been increased.

Herein, in the electrophotography process, as a method of realizing high image quality, there is a method of reducing a beam size for exposure. According to the method of reducing the beam size for exposure, small electrostatic latent images are formed, so that resolution can be increased.

However, controlling an image height of the formed electrostatic latent image while reducing the beam size for exposure is difficult and causes high cost in image formation.

In addition, the cost of the controlling the image height of the formed electrostatic latent image while reducing the beam size for exposure accounts for a large fraction of the entire cost of the image forming apparatus.

Therefore, in the electrophotography process, there has been a requirement for forming micro-sized electrostatic latent images without reducing the beam size for exposure.

In addition, in the image forming method of the related art, a line image and a solid image are different in toner adhesion amount height, that is, a pile height. The difference in pile height is caused from a difference in size itself of the electrostatic latent image.

As described above, by considering the demand for improvement of image quality and the demand for reduction of environmental burden such as reduction of toner usage or reduction of power usage, there has been a need for appropriately controlling the pile height.

Here, in the case of controlling the pile heights of the line image and the solid image, a method of performing treatment in a developing process is conceivable.

However, since the line image and the solid image have a difference in size itself of the electrostatic latent image, in order to control the pile height in the developing process, developing needs to be performed by differentiating sensitivity of the latent image of the line image and sensitivity of the latent image of the solid image.

That is, the method of controlling the pile height by setting the sensitivity of the latent image of the line image and the sensitivity of the latent image of the solid image to be different from each other is not preferred because there is a problem such as a loss in fidelity of the latent image.

As described above, in the image formation, controlling the pile height without performing treatment in the developing process is desired. In addition, in the image forming method, desired is a method of forming an electrostatic latent image such that the difference between image data and output image occurring in the electrophotography process, other than the pile height, can be offset.

In addition, there is disclosed a technique where, in the image formation, in the case where an area of input image is smaller than a predetermined value, exposure energy per unit pixel is set to be higher than the exposure energy per unit pixel at the time of solid image writing (for example, refer to Japanese Patent Application Laid-open No. 2005-193540).

In addition, there is disclosed a technique where, in the image formation, light energy exposed from each light source is corrected to be uniform by thinning out exposure pixels or adding the exposure pixels (for example, refer to Japanese Patent Application Laid-open No. 2007-190787).

In the image formation, in the case where a dot density is high, for example, 1200 dpi, there is a demand for an output image where micro-sized characters corresponding to two or three points, particularly, a character of a reversed image becoming two or three void points can be recognized.

However, in the image formation, although developing, transfer, and fixing processes are improved in order to output a high-quality image with a high dot density, the outputting the high-quality image has been difficult.

Here, although the measuring the electrostatic latent image in a micrometer scale was difficult, in recent years, the measurement of the electrostatic latent image at a high accuracy has been enabled. As a result, it is found out that degradation factor in the image formation is generated in the latent image stage before the developing.

That is, it is found out that, even though the reversed image is output using the image pattern as is, a latent image electric vector in a vertical direction of a sample occurring in a normal image is not reversed, and a vector of the reversed image is smaller than a vector of the image pattern.

Therefore, in the image formation, in the case of outputting a micro-sized image with a high dot density, discrepancy occurs between the latent image and an image pattern signal supplied from a controller due to influence of the beam size or charge diffusion. For this reason, in the image forming method, in the case of outputting a micro-sized image with a high dot density, even if the developing, transfer, and fixing processes are improved, a high-quality image could not be output.

Particularly, in order to print a character of the reversed image with a high image quality, it is effective to increase the latent image electric vector in the vertical direction of the sample towards such a side that toner is made not to adhere. In terms of electromagnetism, the simplest method of increase the electric vector in a white portion is to increase a charge amount in a white image portion. However, it is difficult to locally increase a electrification charge amount.

There is a need to provide an image forming method capable of forming a high-quality image by an image pattern including an image portion composed of a plurality of pixels and a non-image portion.

SUMMARY OF THE INVENTION

It is an object of the present invention to at least partially solve the problems in the conventional technology.

An image forming method forms an electrostatic latent image corresponding to an image pattern including an image portion and a non-image portion by exposing a surface of an image bearer with light according to the image pattern. The image portion includes a plurality of pixels. Among the pixels constituting the image portion, at least a group of pixels existing at a boundary with respect to the non-image portion is set as a non-exposure pixel group. Among the pixels constituting the image portion, at least a group of pixels existing at a boundary with respect to the non-exposure pixel group is set as a high power exposure pixel group where exposure is performed with light of a higher light power value than a predetermined light power value required for exposing the image portion.

An image forming apparatus exposes a surface of an image bearer with light according to an image pattern including an image portion and a non-image portion and capable of selecting one from at least two types of image qualities of an output. The image portion includes a plurality of pixels. Among the pixels constituting the image portion, at least a group of pixels existing at a boundary with respect to the non-image portion is set as a non-exposure pixel group. When a first image quality is selected, the light power value for exposing the image portion is set as a first light power value. When a second image quality is selected, among the pixels constituting the image portion, at least a group of pixels existing at a boundary with respect to the non-exposure pixel group is exposed with a light power value which is higher than the first light power value.

A print material production method includes a process of exposing a surface of an image bearer with light according to an image pattern including an image portion and a non-image portion to form an electrostatic latent image corresponding to the image pattern. The image portion includes a plurality of pixels. In the process of forming the electrostatic latent image, among the pixels constituting the image portion, at least a group of pixels existing at a boundary with respect to the non-image portion is set as a non-exposure pixel group. Among the pixels constituting the image portion, at least a group of pixels existing at a boundary with respect to the non-exposure pixel group is set as a high power exposure pixel group where exposure is performed with light of a higher light power value than a predetermined light power value required for exposing the image portion.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 21 is a schematic diagrams illustrating examples of the light power values of the exposure patterns of the line images in FIGS. 20A to 20D;

FIG. 34 is a central cross-sectional diagram illustrating an example of an electrostatic latent image measurement device;

DETAILED DESCRIPTION OF THE PREFERRED EMBODIMENTS

Hereinafter, embodiments of an image forming method and an image forming apparatus according to the present invention will be described with reference to the drawings.
Image Forming Apparatus First, an image forming apparatus according to the present invention will be described.

Figure 1:
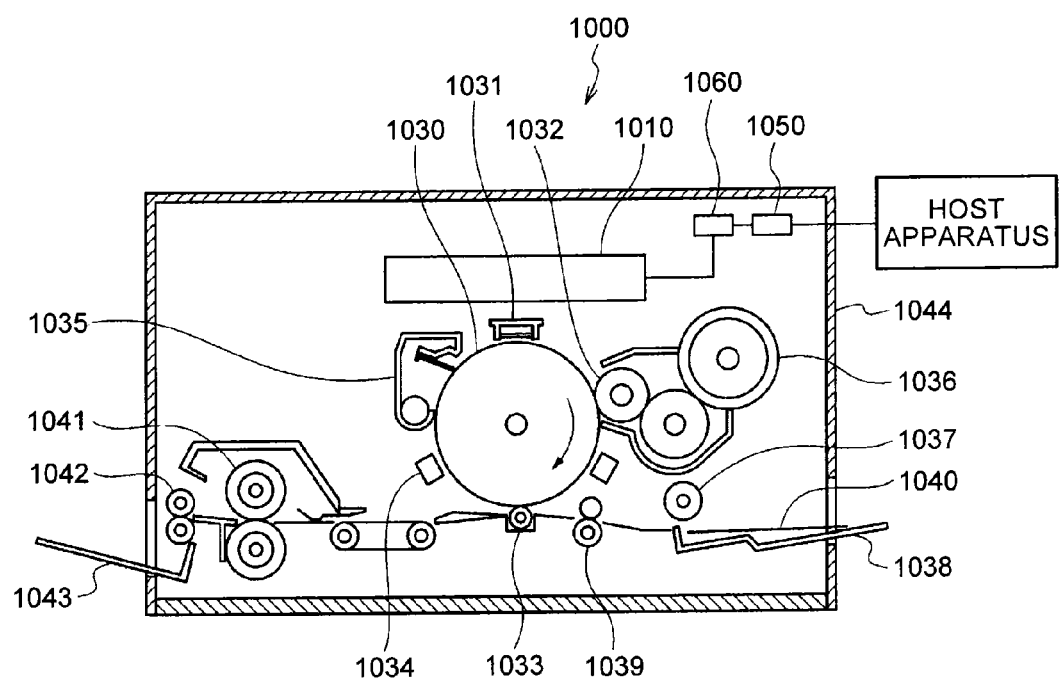
FIG. 1 is a central cross-sectional diagram illustrating an embodiment of an image forming apparatus according to the present invention.

FIG. 1 is a central cross-sectional diagram illustrating an embodiment of an image forming apparatus according to the present invention. In the figure, a schematic configuration of a laser printer 1000 is illustrated as the image forming apparatus according to the present invention.

The laser printer 1000 is constructed such that devices for performing an electrophotography process of charging, exposing, developing, transfer, and cleaning are arranged around a photoconductor drum 1030 in this order along a rotation direction of the photoconductor drum 1030. More specifically, the laser printer includes a charging device 1031 performing a charging process, an optical scanning device 1010 performing an exposure process, a developing device 1032 performing a developing process, a transfer device 1033 performing a transfer process, and a cleaning unit 1035 performing a cleaning process. Here, a neutralizing unit 1034 is disposed between the transfer device 1033 and the cleaning unit 1035.

The developing device 1032 includes a toner cartridge 1036 and a developing roller (not illustrated) which adheres toner supplied from the toner cartridge 1036 on a surface of the photoconductor drum 1030 and visualizes a latent image on the surface of the photoconductor drum 1030 by the toner.

The transfer device 1033 transfers a toner image of the surface of the photoconductor drum 1030 to a recording sheet 1040 drawn out from paper feeding tray 1038 by a paper feeding roller 1037. A front end of the recording sheet 1040 is positioned by a registration roller 1039, and the recording sheet is ejected through a fixing device 1041 to a paper ejection tray 1043 by a paper ejection roller 1042 in synchronization with the toner image of the surface of the photoconductor drum 1030.

In addition, the laser printer 1000 includes a communication control device 1050 and a printer control device 1060.

Incidentally, the above-described components of the laser printer 1000 are accommodated at predetermined positions inside a printer case 1044.

The communication control device 1050 controls bi-directional communication with a host apparatus (for example, an information processing apparatus such as a PC) via a network or the like.

The printer control device 1060 includes a Central Processing Unit (CPU) and a Read Only Memory (ROM), which are not illustrated. In addition, the printer control device 1060 includes a Random Access Memory (RAM) and an Analog/Digital (A/D) converter. Here, the printer control device 1060 overall controls the components in response to requests from the host apparatus and transmits image information of the host apparatus to the optical scanning device 1010.

The ROM stores a program which is written in code readable by the CPU and various data used to execute the program.

The RAM is a temporary writable memory for a task of the CPU.

The A/D converter converts an analog signal into a digital signal.

The photoconductor drum 1030 is a latent image bearer of a cylindrical member, and a photoconductor layer is formed on the surface thereof. That is, the surface of the photoconductor drum 1030 is a scanning surface. In addition, the photoconductor drum 1030 is rotated by a driving mechanism (not illustrated) in the arrow direction in FIG. 1.

The charging device 1031 uniformly charges the surface of the photoconductor drum 1030. Here, for example, a contact type charging roller where a small amount of ozone is generated or a corona charger using corona discharge may be used for the charging device 1031.

Figure 2:
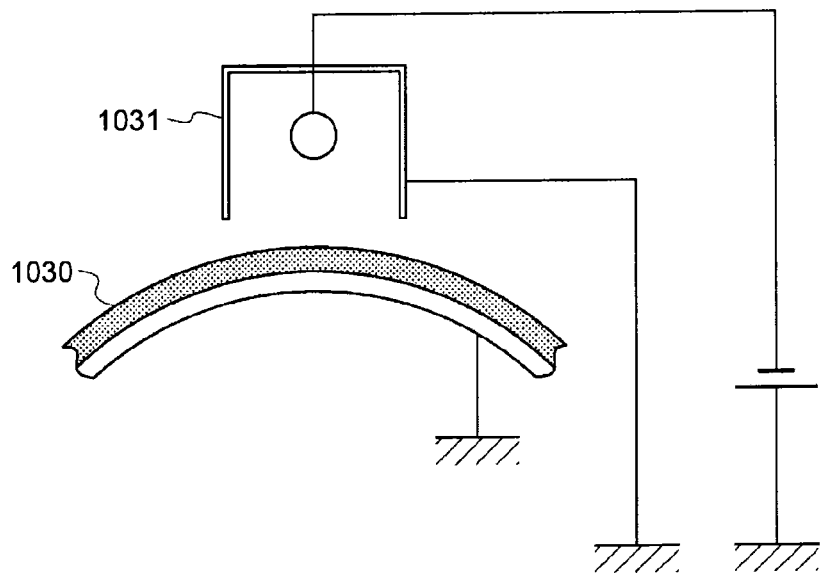
FIG. 2 is a schematic diagram illustrating a corotron type charging device of the image forming apparatus.
Figure 3:
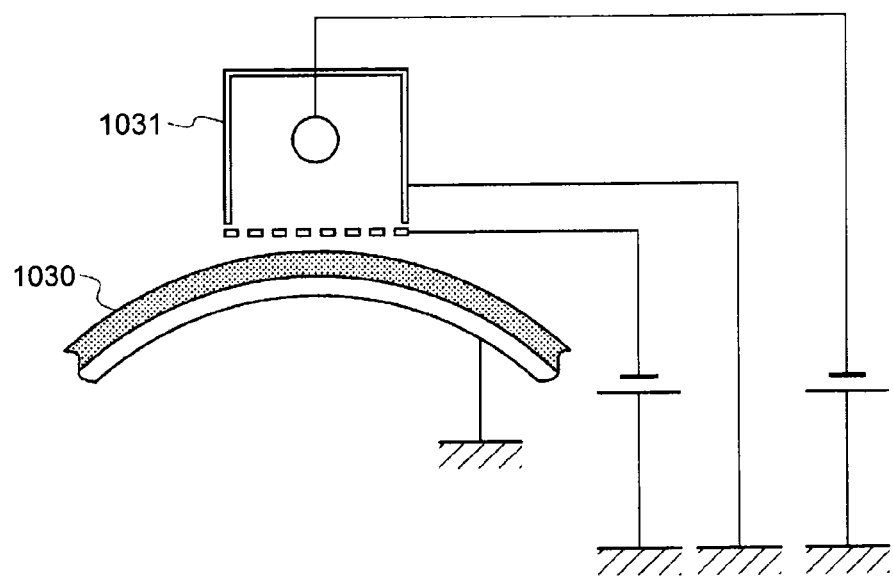
FIG. 3 is a schematic diagram illustrating a scorotron type charging device of the image forming apparatus.

FIG. 2 is a schematic diagram illustrating a corotron type charging device of the image forming apparatus. In addition, FIG. 3 is a schematic diagram illustrating scorotron type charging device of the image forming apparatus. Here, the charging device 1031 may be the corotron type charging device illustrated in FIG. 2, may be the scorotron type charging device illustrated in FIG. 3, or may be a roller type charging device (not illustrated).

Returning to FIG. 1, the optical scanning device 1010 performs exposure by scanning the surface of the photoconductor drum 1030 charged by the charging device 1031 with light flux modulated based on the image information of the printer control device 1060. The optical scanning device 1010 forms the electrostatic latent image corresponding to the image information on the surface of the photoconductor drum 1030.

The electrostatic latent image formed by the optical scanning device 1010 is moved toward the developing device 1032 according to the rotation of the photoconductor drum 1030. Incidentally, details of the optical scanning device 1010 will be described later.

The toner cartridge 1036 contains the toner (developing agent). The toner is supplied from the toner cartridge 1036 to the developing device 1032.

The developing device 1032 develops the electrostatic latent image by adhering the toner supplied from the toner cartridge 1036 to the latent image formed on the surface of the photoconductor drum 1030. Here, the image (hereinafter, referred to as a "toner image") where the toner is adhered is moved toward the transfer device 1033 according to the rotation of the photoconductor drum 1030.

The paper feeding tray 1038 contains the recording sheet 1040. The paper feeding roller 1037 is disposed in the vicinity of the paper feeding tray 1038.

The paper feeding roller 1037 draws the recording sheet 1040 out from the paper feeding tray 1038 one by one. The recording sheet 1040 is drawn out from the paper feeding tray 1038 toward a gap between the photoconductor drum 1030 and the transfer device 1033 in accordance with the rotation of the photoconductor drum 1030.

The transfer device 1033 is applied with a voltage having a polarity opposite to the toner in order to electrically attract the toner of the surface of the photoconductor drum 1030 to the recording sheet 1040. Due to the voltage, the toner image of the surface of the photoconductor drum 1030 is transferred to the recording sheet 1040. The recording sheet 1040 where the toner image is transferred is transported to the fixing device 1041.

In the fixing device 1041, heat and pressure are applied to the recording sheet 1040, so that the toner is fixed on the recording sheet 1040. Here, the recording sheet 1040 where the toner is fixed is ejected through the paper ejection roller 1042 to the paper ejection tray 1043 to be sequentially stacked on the paper ejection tray 1043, so that a print material is produced.

The neutralizing unit 1034 neutralizes the surface of the photoconductor drum 1030.

The cleaning unit 1035 removes the toner remaining on the surface of the photoconductor drum 1030 (residual toner). The surface of the photoconductor drum 1030 where the residual toner is removed is returned to a position facing the charging device 1031.

In the image forming apparatus according to the present invention, the electrostatic latent image is formed by the charging device, the optical scanning device as an exposing device, the photoconductor, and the image processing section for converting the image pattern into an optical output.

The processes for obtaining the output image in the electrophotography method of a copier or a laser printer are as follows. That is, in the electrophotography method, in the charging process, the photoconductor as one latent image bearer is uniformly charged. In addition, in the electrophotography method, in the exposure process, charges are partially escaped by irradiating the photoconductor with light. By doing so, in the electrophotography method, the electrostatic latent image can be formed on the photoconductor.

Configuration of Optical Scanning Device

Next, a configuration of the optical scanning device 1010 constituting the image forming apparatus will be described.

Figure 4:
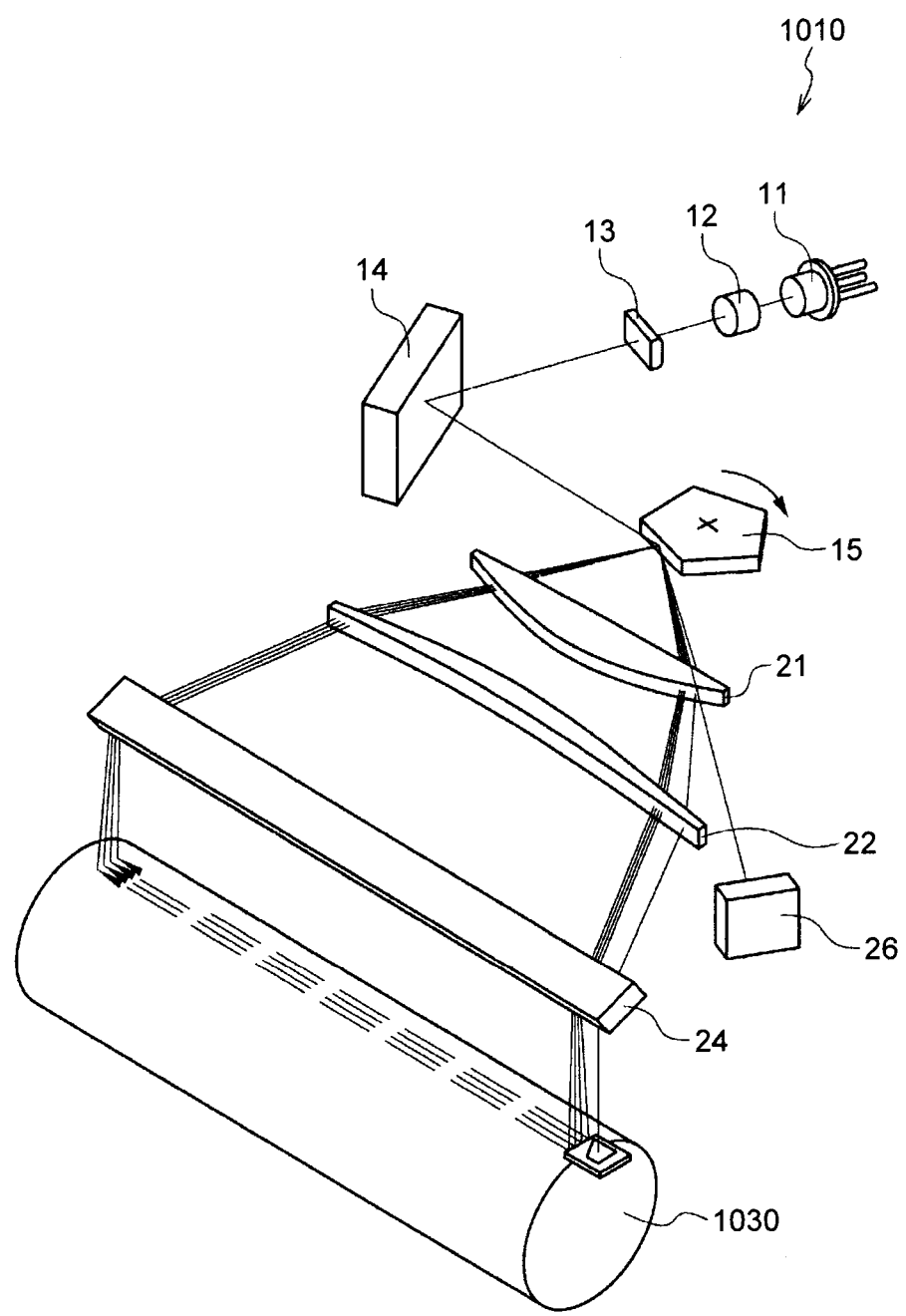
FIG. 4 is a schematic diagram illustrating an example of an optical scanning device constituting the image forming apparatus.

FIG. 4 is a schematic diagram illustrating an example of the optical scanning device 1010. As illustrated in the figure, the optical scanning device 1010 includes a light source 11, a collimator lens 12, a cylindrical lens 13, a folding mirror 14, a polygon mirror 15, and a first scanning lens 21. In addition, the optical scanning device 1010 further includes a second scanning lens 22, a folding mirror 24, a synchronization detection sensor 26, and a scanning control device (not illustrated).

Here, the optical scanning device 1010 is assembled at a predetermined position of an optical housing (not illustrated).

Incidentally, in the description hereinafter, the direction along the longitudinal direction (rotation axis direction) of the photoconductor drum 1030 is called the Y axis direction of the XYZ three-dimensional rectangular coordinate system, the direction along the rotation axis of the polygon mirror 15 is called the Z axis direction, and the direction perpendicular to the Y and Z axes is called the X axis direction.

In addition, in the description hereinafter, the direction corresponding to the main-scanning direction of each optical member is called the "main-scanning corresponding direction", and the direction corresponding to the sub-scanning direction is called the "sub-scanning corresponding direction".

The light source 11 includes a plurality of light-emitting units (not illustrated) which are, for example, two-dimensionally arrayed. Here, when all the light-emitting units are orthogonally projected on a virtual line extending in the sub-scanning corresponding direction, light-emitting units are arrayed such that intervals between the light-emitting units are equal.

Here, the light source 11 may be constructed by using a semiconductor laser (Laser Diode: LD), a light emitting diode (Light Emitting Diode: LED), or the like.

Figure 5:
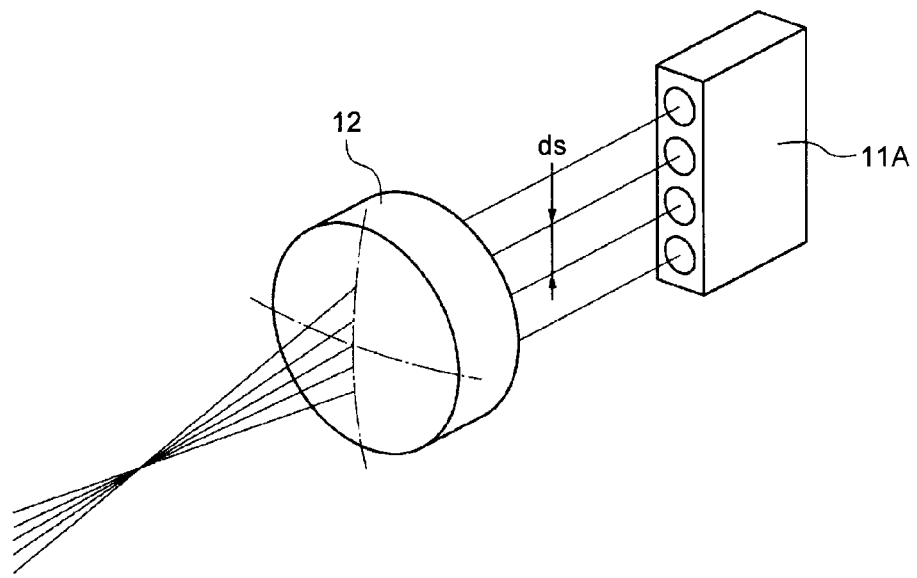
FIG. 5 is a schematic diagram illustrating an example of a light source of the optical scanning device.

FIG. 5 is a schematic diagram illustrating an example of the light source of the optical scanning device 1010. In the figure, a light source 11A as a multi-beam light source is a semiconductor laser array constructed by arraying four semiconductor lasers. In addition, the light source 11A is disposed to be perpendicular to the optical axis direction of the collimator lens 12.

Figure 6:
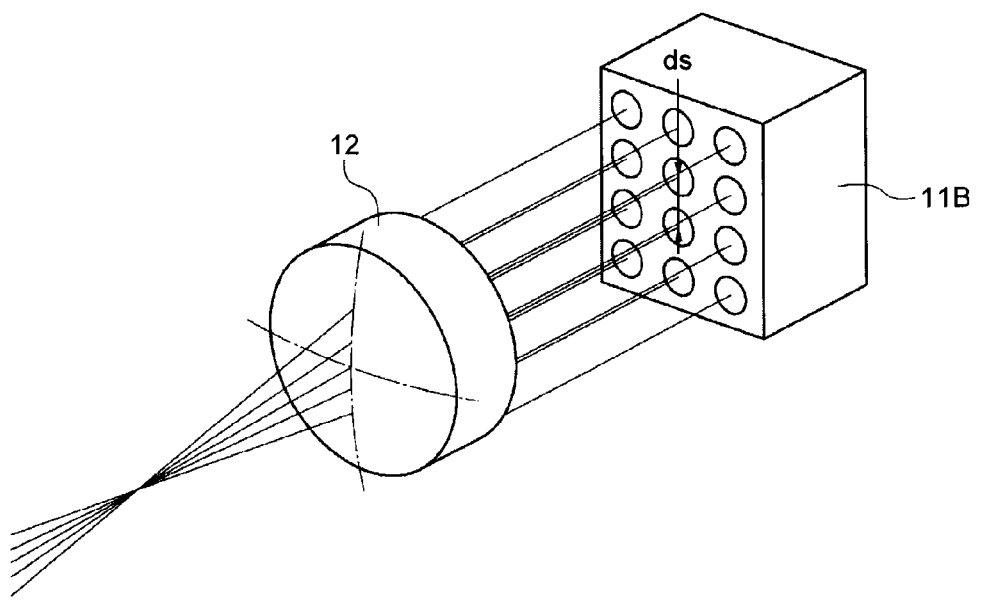
FIG. 6 is a schematic diagram illustrating another example of the light source of the optical scanning device.

FIG. 6 is a schematic diagram illustrating another example of the light source of the optical scanning device 1010. In the figure, a light source 11B is a vertical cavity surface emitting laser (VCSEL) having a wavelength of, for example, 780 nm where light emitting points are arranged in a plane including the Y and Z axis directions.

The light source 11B has, for example, a total of twelve light emitting points, that is, three light emitting points in the horizontal direction (main-scanning direction, Y axis direction) and four light emitting points in the vertical direction (sub-scanning direction, Z axis direction).

In addition, in the case where the light source 11B is applied to the optical scanning device 1010, respective scan lines may be scanned with three light emitting points arranged in the horizontal direction, so that four scan lines in the vertical direction are simultaneously scanned.

Here, in the description hereinafter, a "light-emitting unit interval" denotes a distance between centers of two light-emitting units.

Returning to FIG. 4, the collimator lens 12 is disposed on the optical path of the light emitted from the light source 11 to control the light to be parallel light or substantially parallel light.

The cylindrical lens 13 converges the light passing through the collimator lens 12 only in the Z axis direction (sub-scanning direction) in the vicinity of a deflecting reflection plane of the polygon mirror 15.

The cylindrical lens 13 forms an image of the light emitted from the light source 11 as a line image elongated in the main-scanning direction (Y axis direction) in the vicinity of a reflection plane of the folding mirror 14.

The folding mirror 14 reflects the light having passed through the cylindrical lens 13 and imaged, toward the polygon mirror 15.

In addition, the optical system disposed on the optical path between the light source 11 and the polygon mirror 15 is also called a pre-deflector optical system.

The polygon mirror 15 is a polygon mirror rotating around the rotation axis perpendicular to the longitudinal direction (rotation axis direction) of the photoconductor drum 1030. Here, each mirror plane of the polygon mirror 15 is a deflecting reflection plane.

A driving Integrated Circuit (IC) (not illustrated) applies appropriate clock to a motor unit (not illustrated), so that the polygon mirror 15 is rotated at a desired constant speed.

The polygon mirror 15 is rotated at a constant speed in the arrow direction by the motor unit, and a plurality of light beams reflected on the deflecting reflection planes becomes respective deflecting beams to be deflected at a constant angular velocity.

The first scanning lens 21, the second scanning lens 22, the folding mirror 24, and the synchronization detection sensor 26 constitute a scanning optical system. The scanning optical system is disposed on the optical path of the light deflected by the polygon mirror 15.

The first scanning lens 21 is disposed on the optical path of the light deflected by the polygon mirror 15.

The second scanning lens 22 is disposed on the optical path of the light through the first scanning lens 21.

The folding mirror 24 is an elongated plane mirror and folds the optical path of the light through the second scanning lens 22 to the direction toward the photoconductor drum 1030.

That is, the photoconductor drum 1030 is irradiated with the light deflected by the polygon mirror 15 through the first scanning lens 21 and the second scanning lens 22, so that light spots are formed on the surface of the photoconductor drum 1030.

The light spot of the surface of the photoconductor drum 1030 is moved along the longitudinal direction of the photoconductor drum 1030 according to the rotation of the polygon mirror 15. Here, the movement direction of the light spot on the surface of the photoconductor drum 1030 is the "main-scanning direction", and the rotation direction of the photoconductor drum 1030 is the "sub-scanning direction".

The synchronization detection sensor 26 receives the light from the polygon mirror 15 and outputs a signal (photoelectric conversion signal) according to a received light amount to the scanning control device. Here, the output signal of the synchronization detection sensor 26 is also called a "synchronization detection signal".

As illustrated in FIG. 4, in the optical scanning device 1010, by the scanning using one deflecting reflection plane of the polygon mirror 15, a plurality of lines on the scanning surface of the photoconductor drum 1030 is simultaneously scanned. A buffer memory inside the image processing section controlling a light emitting signal of each light emitting point stores print data for one line corresponding to each light emitting point.

The print data are read out for each deflecting reflection plane of the polygon mirror 15, and a light beam is turned on and off on the scan line on the photoconductor drum 1030 as the latent image bearer according to the print data, so that the electrostatic latent image is formed along the scan line.

Figure 7:
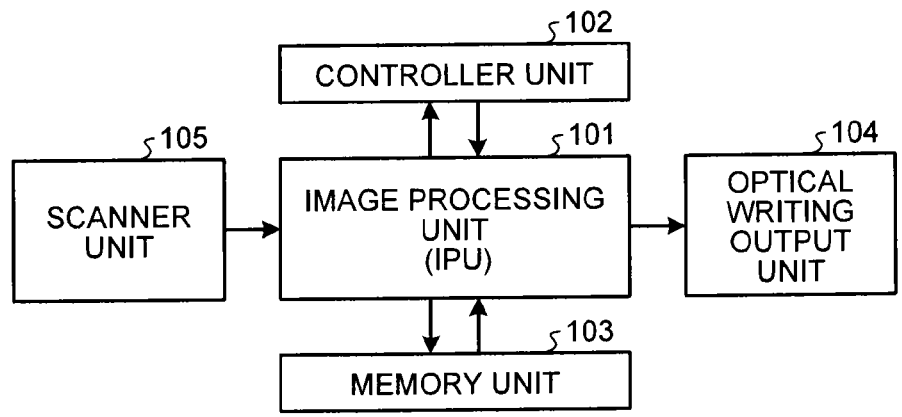
FIG. 7 is a block diagram illustrating an image processing section of the image forming apparatus.

FIG. 7 is a block diagram illustrating the image processing section of the image forming apparatus. As illustrated in the figure, the image processing section includes an image processing unit (Image Processing Unit: IPU) 101, a controller unit 102, a memory unit 103, an optical writing output unit 104, and a scanner unit 105.

The controller unit 102 performs processes of rotation, repeating, collection, compression, decompression, and the like on the image data and after that, outputs the processed image data to the IPU again.

In the memory unit 103, a lookup table for storing various data is prepared.

The optical writing output unit 104 performs optical modulation of the light source 11 according to the lighting data by a control driver and forms the electrostatic latent image on the photoconductor drum 1030. Here, the optical writing output unit 104 forms the electrostatic latent image based on an input signal output from the later-described gradation processing unit. The formed electrostatic latent image causes the developing device 1032, the transfer device 1033, and the like above described to form an image on the recording sheet.

The scanner unit 105 reads the image and generates image data such as Red, Green, and Blue (RGB) data based on the image.

Figure 8:
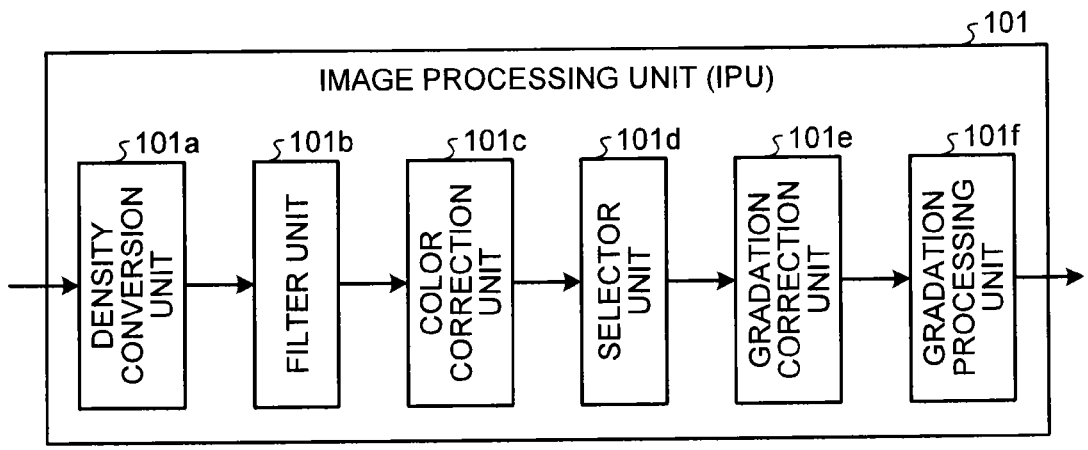
FIG. 8 is a block diagram illustrating an image processing unit of the image processing section.

FIG. 8 is a block diagram illustrating the image processing unit 101 of the image processing section. As illustrated in the figure, image processing unit 101 includes a density conversion unit 101*a*, a filter unit 101*b*, a color correction unit 101*c*, a selector unit 101*d*, a gradation correction unit 101*e*, and a gradation processing unit 101*f*.

The density conversion unit 101*a* converts the RGB image data of the scanner unit 105 into the density data by using the lookup table and outputs the density data to the filter unit 101*b*.

The filter unit 101*b* performs image correction processes such as a smoothing process or an edge enhancing process on the density data input from the density conversion unit 101*a* and output the density data after the image correction processes to the color correction unit 101*c*.

The color correction unit 101*c* performs a color correction (masking) process.

Under the control of the image processing unit 101, the selector unit 101*d* selects any of Cyan (C), Magenta (M), Yellow (Y), and Key Plate (K) from the image data input from the color correction unit 101*c*. The selector unit 101*d* outputs the data of selected C, Y, M, and K to the gradation correction unit 101*e*.

The gradation correction unit 101*e* stores the data of C, M, Y, and K input from the selector unit 101*d* in advance. In the gradation correction unit 101*e*, a γ curve from which linear characteristics are obtained is set for the input data.

The gradation processing unit 101*f* performs a gradation process such as a dither process on the image data input from the gradation correction unit 101*e* and outputs the resulting signal to the optical writing output unit 104.

Light Source Driving Unit

Next, the light source driving unit of the image forming apparatus according to the present invention which performs the image forming method according to the present invention will be described.

Figure 9:
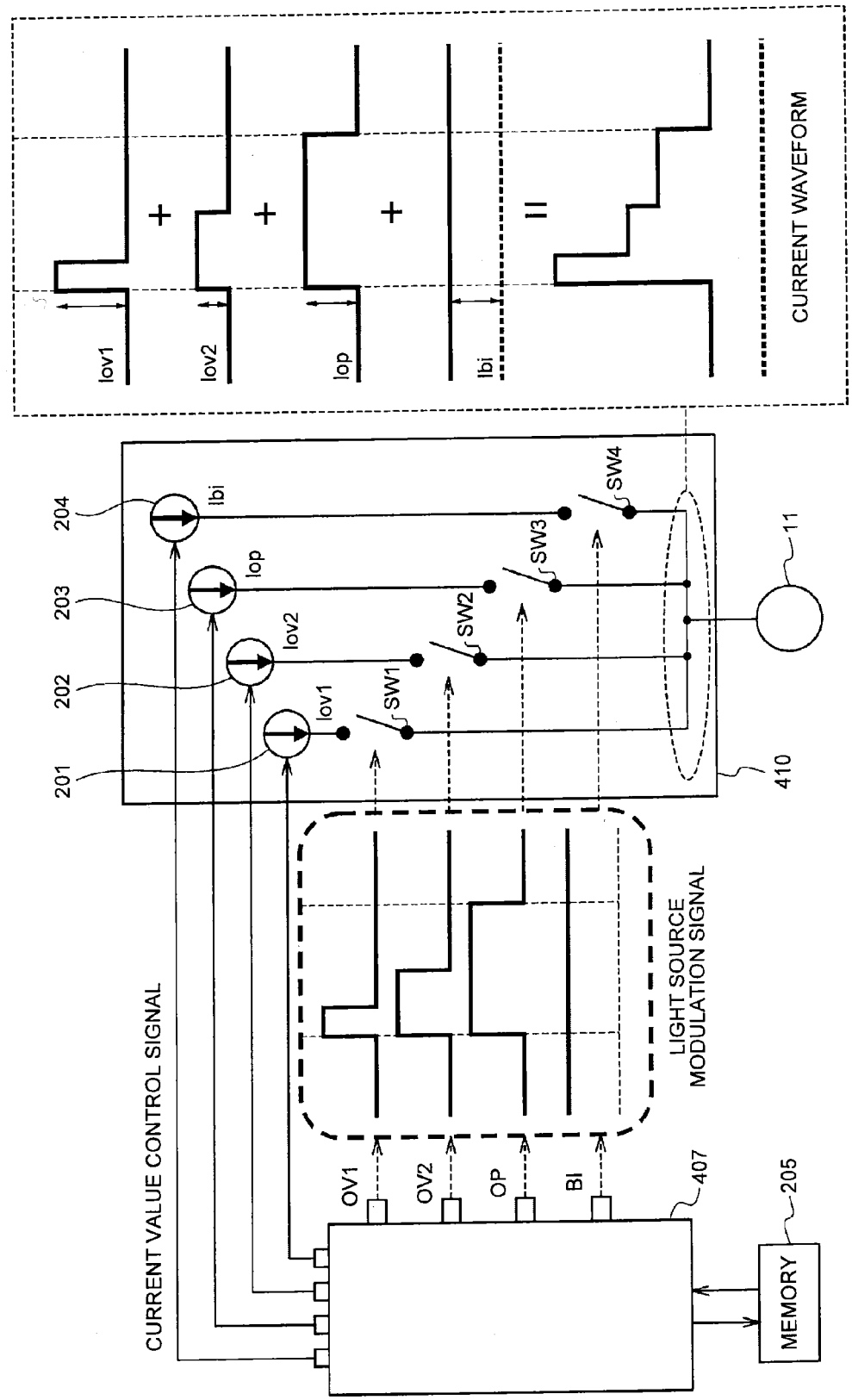
FIG. 9 is a circuit diagram illustrating a light source driving unit constituting the image forming apparatus of FIG. 1.

FIG. 9 is a circuit diagram illustrating the light source driving unit constituting the image forming apparatus of FIG. 1. As illustrated in the figure, the light source driving unit 410 includes current sources 201 to 204, switches SW1 to SW4, and a memory 205. In addition, the light source driving unit 410 is connected to a light source modulation data generating circuit (image processing circuit) 407.

In the image forming apparatus according to the present invention which performs the image forming method according to the present invention, the exposure is performed while changing the light power value corresponding to the position in the main scanning direction in the image portion (corresponding to the time from the start of the exposure of the image portion). By the configuration illustrated in FIG. 9, the light source driving unit 410 may generate a light source driving current by simultaneously performing pulse width modulation and light intensity modulation (PWM+PW modulation).

In general, a current waveform is generated by adding a bias current (Ibi), a basic pattern current (Iop), and overshoot currents (Iov1 and Iov2).

The current source 201 generates the overshoot current Iov1. In addition, the current source 202 generates the overshoot current Iov2. In addition, the current source 203 generates the basic pattern current Iop. In addition, the current 204 generates the bias current Ibi.

Here, the current sources 201 to 204 are controlled by a current value control signal from the light source modulation data generating circuit 407, so that the current value generated by the light source driving unit 410 is determined.

The switches SW1 to SW4 are installed to correspond to the current sources 201 to 204. The switches SW1 to SW4 are controlled by a light source modulation signal from the light source modulation data generating circuit 407. The switches SW1 to SW4 generate a pattern of pulses generated by the light source driving unit 410 by controlling the flow of the current sources 201 to 204.

The memory 205 corresponds to a storage unit and stores information required during a light source driving current generation period. The light source modulation data generating circuit 407 refers to the information of the memory 205.

According to the light source driving unit 410, since the light source modulation signal obtained from the light source modulation data can be converted into the current, the image forming apparatus according to the present invention can generate PM+PWM modulation which simultaneously controls the light power and the lighting time.

Figure 10:
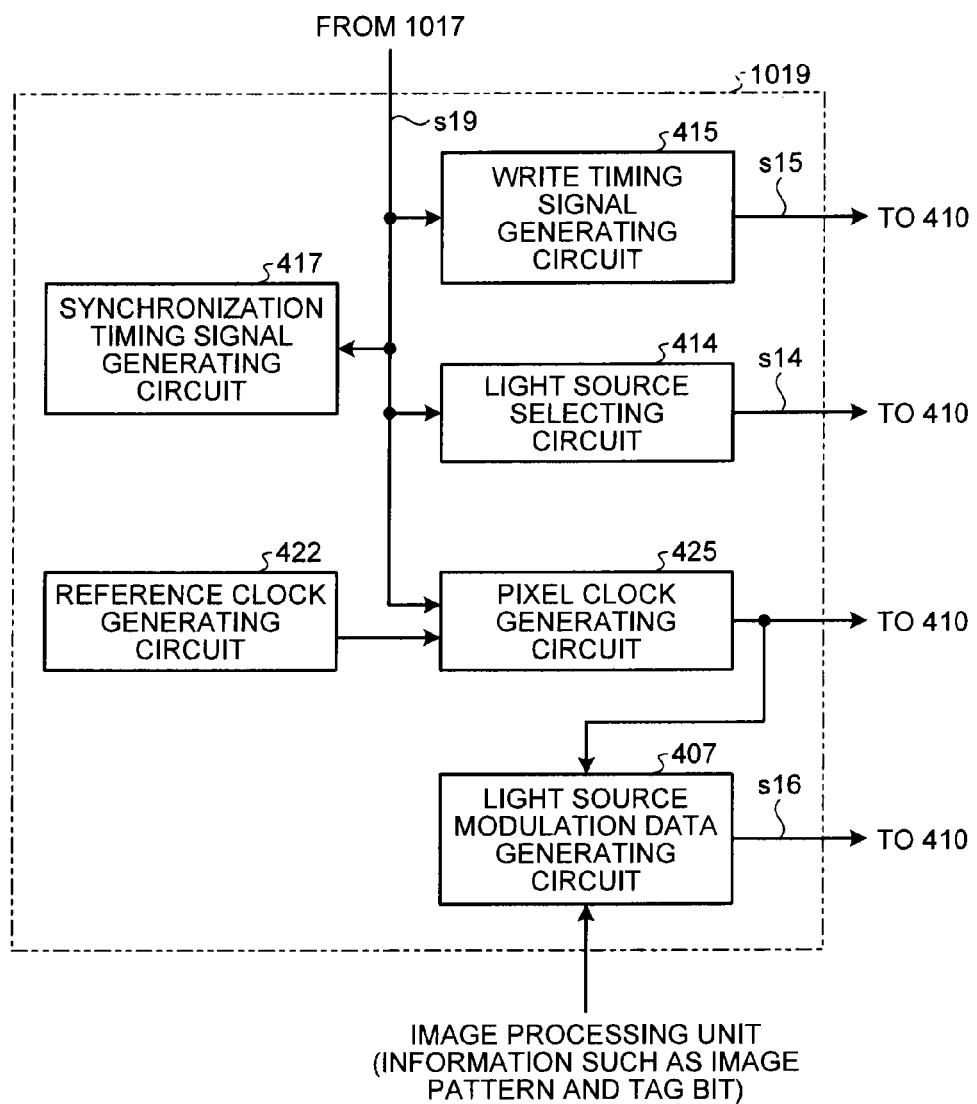
FIG. 10 is a block diagram illustrating a light source driving control unit of the light source driving unit of FIG. 9.

FIG. 10 is a block diagram illustrating the light source driving control unit of FIG. 9. As illustrated in the figure, the light source driving control unit 1019 includes a reference clock generating circuit 422 and a pixel clock generating circuit 425. In addition, the light source driving control unit 1019 includes a light source modulation data generating circuit 407, a light source selecting circuit 414, a write timing signal generating circuit 415, and a synchronization timing signal generating circuit 417.

Incidentally, in FIG. 10, the arrows illustrate the representative flows of signals and information, but the arrows do not illustrate all the connection relationship between the respective blocks.

The reference clock generating circuit 422 generates a high frequency clock signal which is used as a reference of the entire light source driving control unit 1019.

The pixel clock generating circuit 425 mainly includes a Phase Locked Loop (PLL) circuit. The pixel clock generating circuit 425 generates a pixel clock signal based on a synchronization signal s19 and a high-frequency clock signal of the reference clock generating circuit 422.

Here, the pixel clock signal is configured such that the frequency is the same as that of the high-frequency clock signal and the phase is coincident with that of the synchronization signal s19.

Therefore, the pixel clock generating circuit 425 controls the writing position for each scanning by synchronizing the image data with the pixel clock signal.

Here, the generated pixel clock signal is supplied as a kind of the driving information to the light source driving unit 410 and is also supplied to the light source modulation data generating circuit 407. The pixel clock signal supplied to the light source modulation data generating circuit 407 is used as a clock signal for writing data s16.

The light source selecting circuit 414 is a circuit used in the case where a plurality of the light sources is used and outputs a signal designating the selected light-emitting unit. The output signal s14 of the light source selecting circuit 414 is supplied as a kind of the driving information to the light source driving unit 410.

Figure 11:
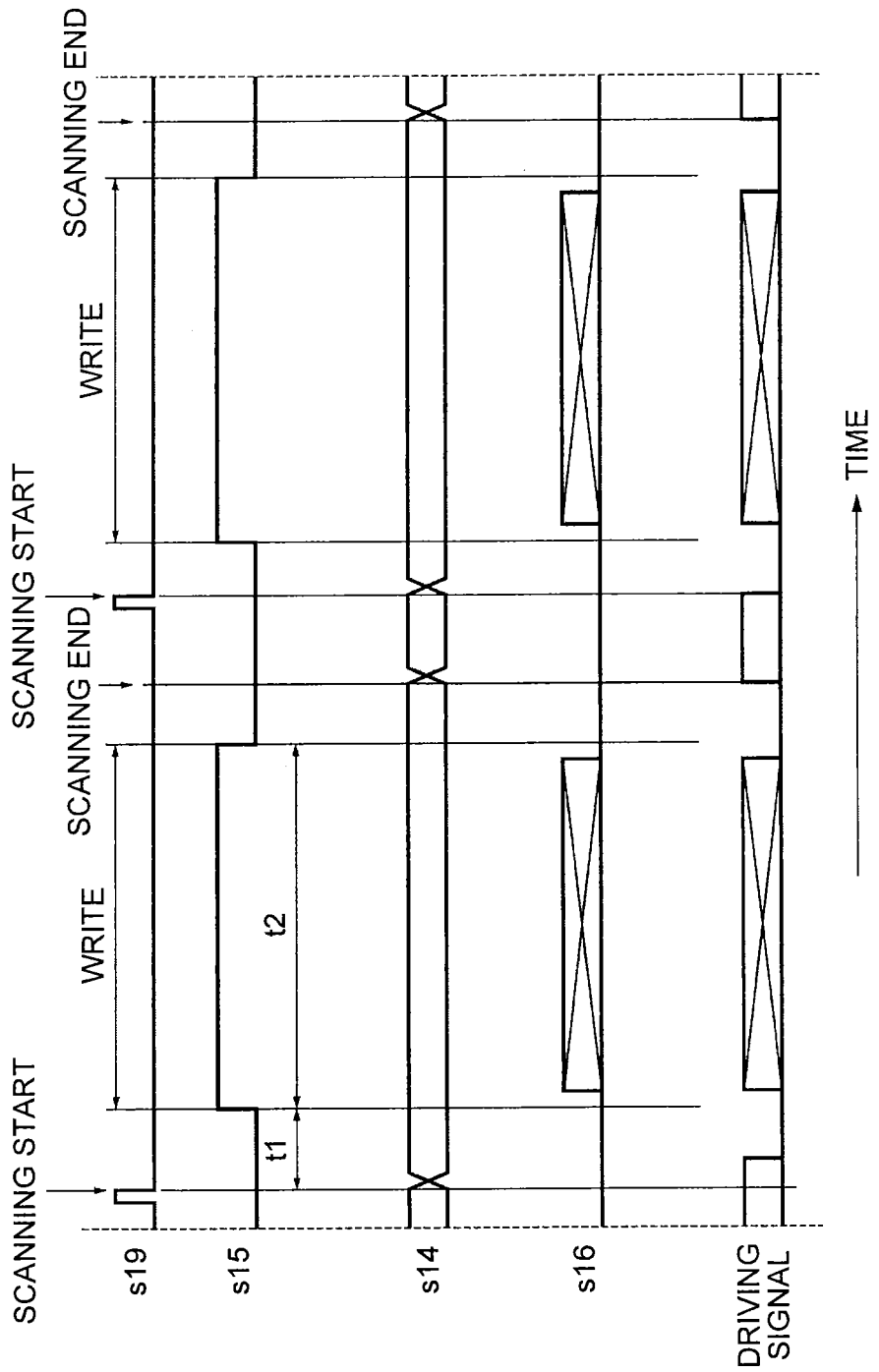
FIG. 11 is a timing chart illustrating operation time of each component of the image forming apparatus of FIG. 1.

FIG. 11 is a timing chart illustrating operation time of each component of the image forming apparatus of FIG. 1. In the figure, s19 denotes an output signal (synchronization signal) of the synchronization detection sensor 26. In addition, s15 denotes an output signal (LGATE signal) of the write timing signal generating circuit 415. In addition, s14 denotes an output signal of the light source selecting circuit 414. In addition, s16 denotes the writing data as an output signal of the light source modulation data generating circuit 407.

The light source modulation data generating circuit 407 corresponds to the light source driving unit of the image forming apparatus according to the present invention. That is, the light source modulation data generating circuit 407 generates the writing data s16 for each light-emitting unit based on the image information of the image processing unit (IPU) or the like. The writing data s16 are supplied as a kind of the driving information to the light source driving unit 410 according to the timing of the pixel clock signal.

Here, in order to form the latent image according to the exposure method according to the embodiment, the light source modulation data generating circuit 407 converts the image data into an exposure pattern according to the PM+PWM signal based on the image pattern information or tag information from the image processing unit.

Image Forming Method

Next, the exposure method in the embodiment of the image forming method according to the present invention will be described.

In the image forming method according to the embodiment, the optical output waveform used for the latent image formation is a waveform for exposing the photoconductor for a predetermined time with the light power value required to obtain a target image density in the image portion including the line image or the solid image.

In addition, the image portion is composed of a plurality of pixels and is a portion for forming an image by adhering toner in the image pattern. In addition, the non-image portion is a portion where no toner is adhered in the image pattern and no image is formed.

In the description hereinafter, the image density as a target is called a "target image density". In addition, in the description hereinafter, a predetermined light power value required to obtain the target image density is called a "target exposure output value". In addition, in the description hereinafter, a predetermined time for exposing the entire pixels of the image portion with the target exposure output value to obtain the target image density is called a "target exposure time".

In addition, in the description hereinafter, an exposure method of exposing for the target exposure time with the target exposure output value is called "standard exposure". In addition, in the embodiment, the solid image denotes an image portion having an area larger than that of a line image.

In addition, in the description hereinafter, the exposing the photoconductor with the light power value (first light power value) higher than the target exposure output value for the exposure time shorter than the target exposure time is called "time concentration exposure".

In addition, in the description hereinafter, the time concentration exposure may also be called TC (Time Concentration) exposure.

Figure 12:
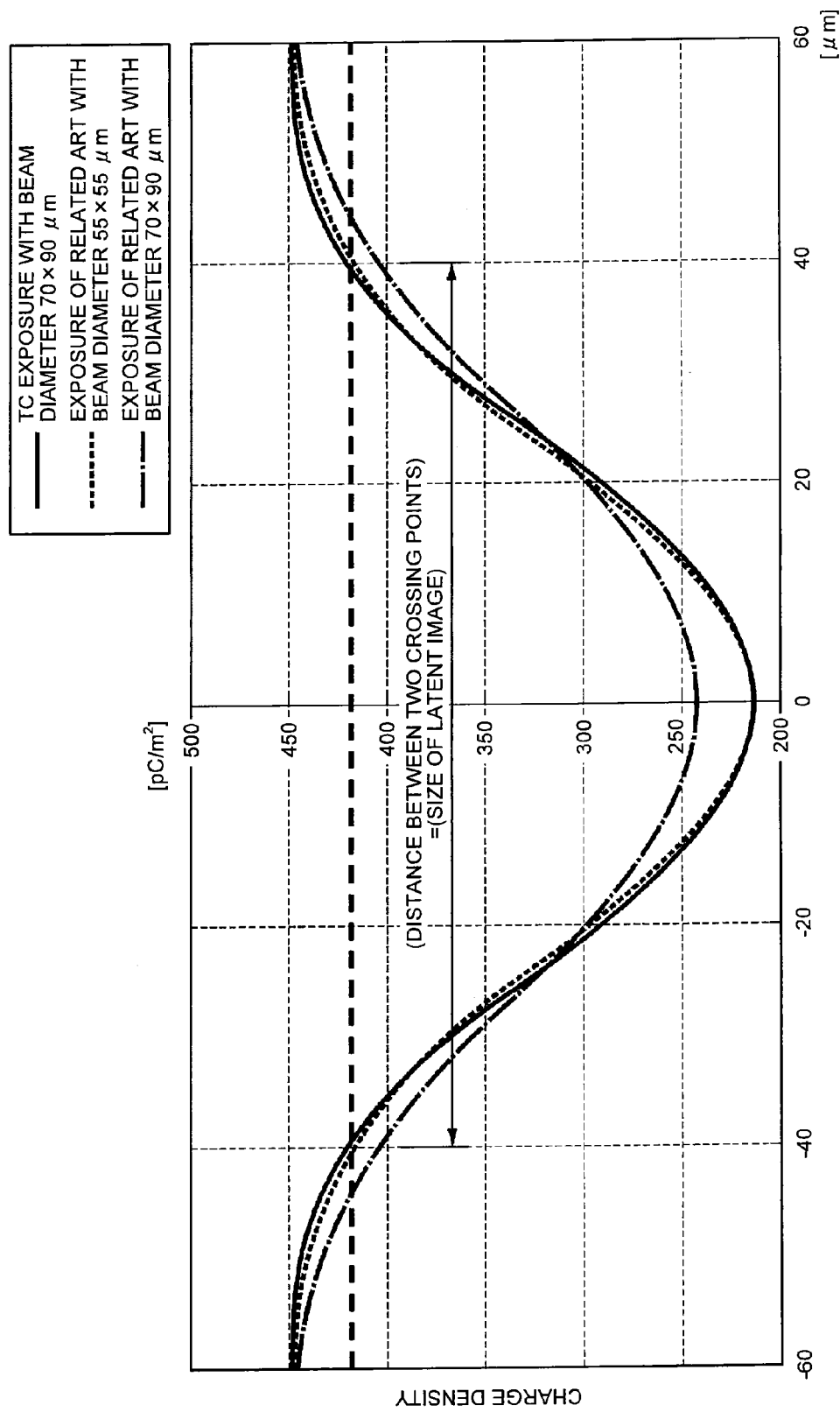
FIG. 12 is a graph illustrating latent image diameters formed by the image forming methods of a reference example and the present invention.

FIG. 12 is a graph illustrating a latent image diameter formed by the image forming methods according to the reference example and the present invention. The figure illustrates results of simulation of 2-dot latent image charge distributions in the case where the dot density is 1200 dpi according to the exposure method of the reference example where the standard exposure is performed and the exposure method of the embodiment where the time concentration exposure is performed. Here, in the time concentration exposure, the exposure is performed by setting the light power value of the image pixel to 400% of the target exposure output value.

The latent image charge distribution illustrated in FIG. 12 illustrates that the latent image diameter in the time concentration exposure of the beam spot diameter 70×90 μm and the latent image diameter in the standard exposure of the beam spot diameter 55×55 μm are equivalent to each other. That is, according to the embodiment, the effect equivalent to the effect of the reduction of the beam spot diameter in the standard exposure can be obtained by using the time concentration exposure.

Figure 13:
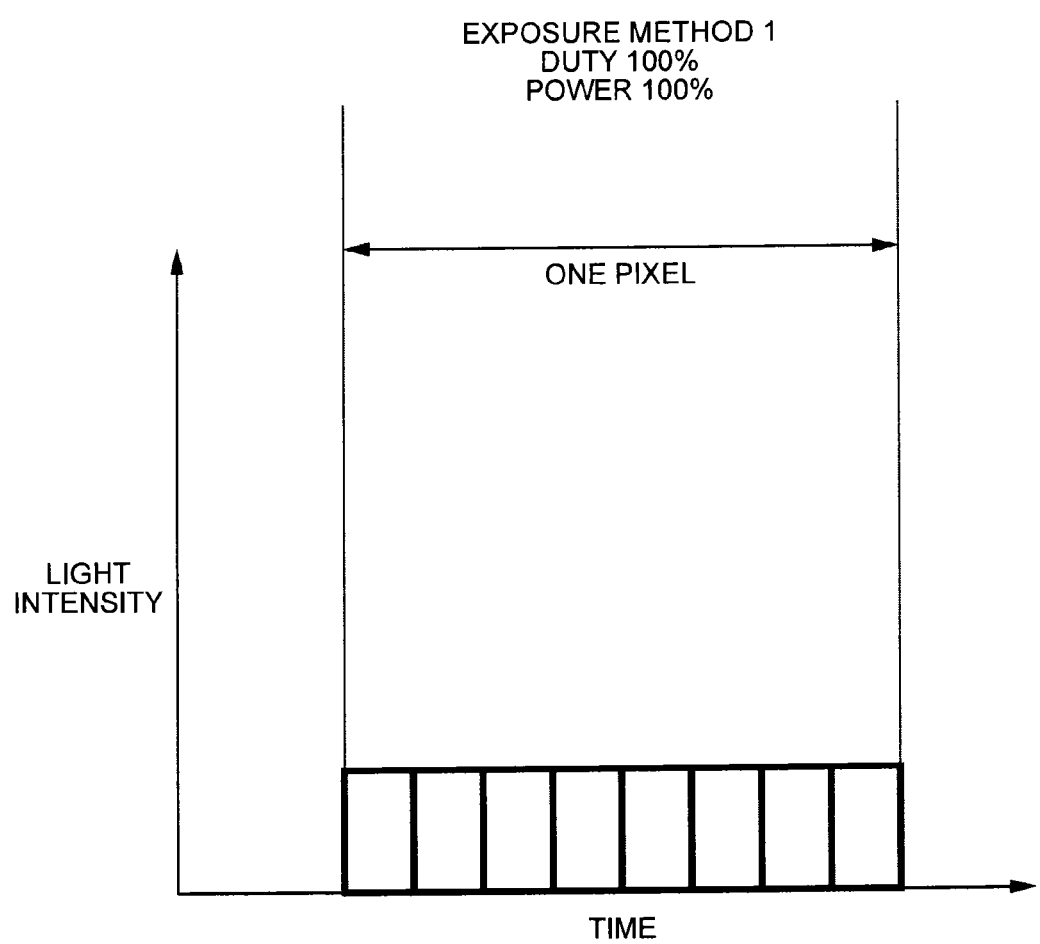
FIG. 13 is a schematic diagram illustrating an example of an exposure method of the reference example.

FIG. 13 is a schematic diagram illustrating an example of the exposure method in the reference example. As illustrated in the figure, the exposure method (hereinafter, referred to as an "exposure method 1") according to the standard exposure of the reference example is a waveform for exposing the photoconductor for the target exposure time with the target exposure output value as described above with respect to the 1-dot image portion including the line image or the solid image. Here, the target exposure output value is set to 100% of the light power value, and the target exposure time is set to a duty ratio of 100%.

Figure 14:
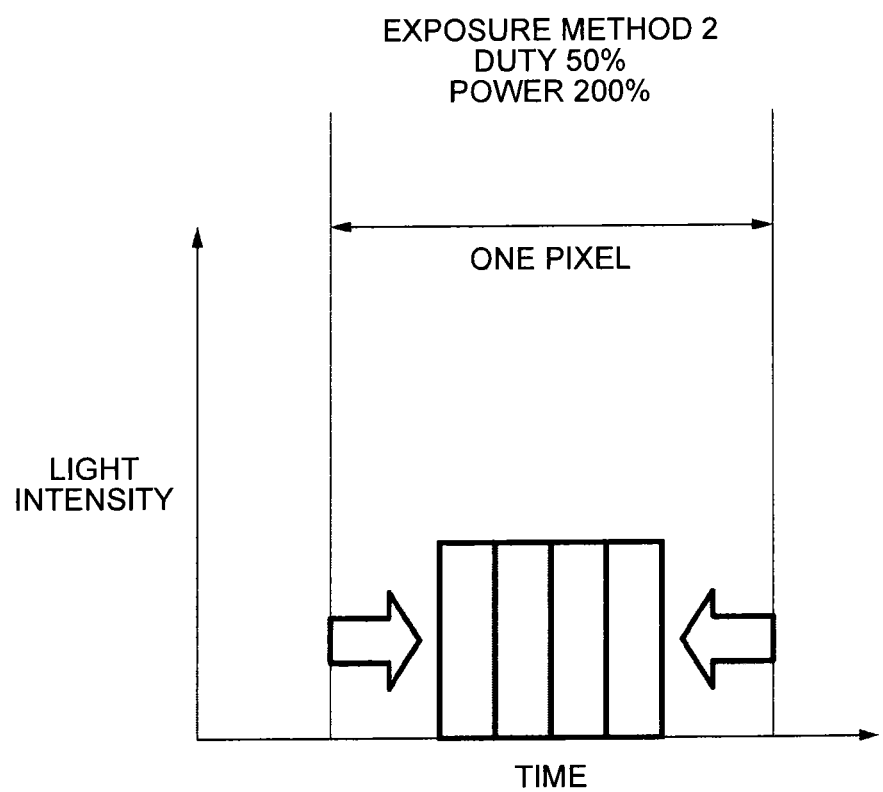
FIG. 14 is a schematic diagram illustrating an example of the image forming method.

FIG. 14 is a schematic diagram illustrating an example of the image forming method according to the present invention. As illustrated in the figure, in the exposure method (hereinafter, referred to as an "exposure method 2") according to the time concentration exposure according to the embodiment, the photoconductor is exposed with the target exposure output value being set to 200% of the light power value and with the target exposure time being set to a duty ratio of 50%. Here, when the width of the image portion is set to one, the width of the exposing section is 4/8 pixels.

Figure 15:
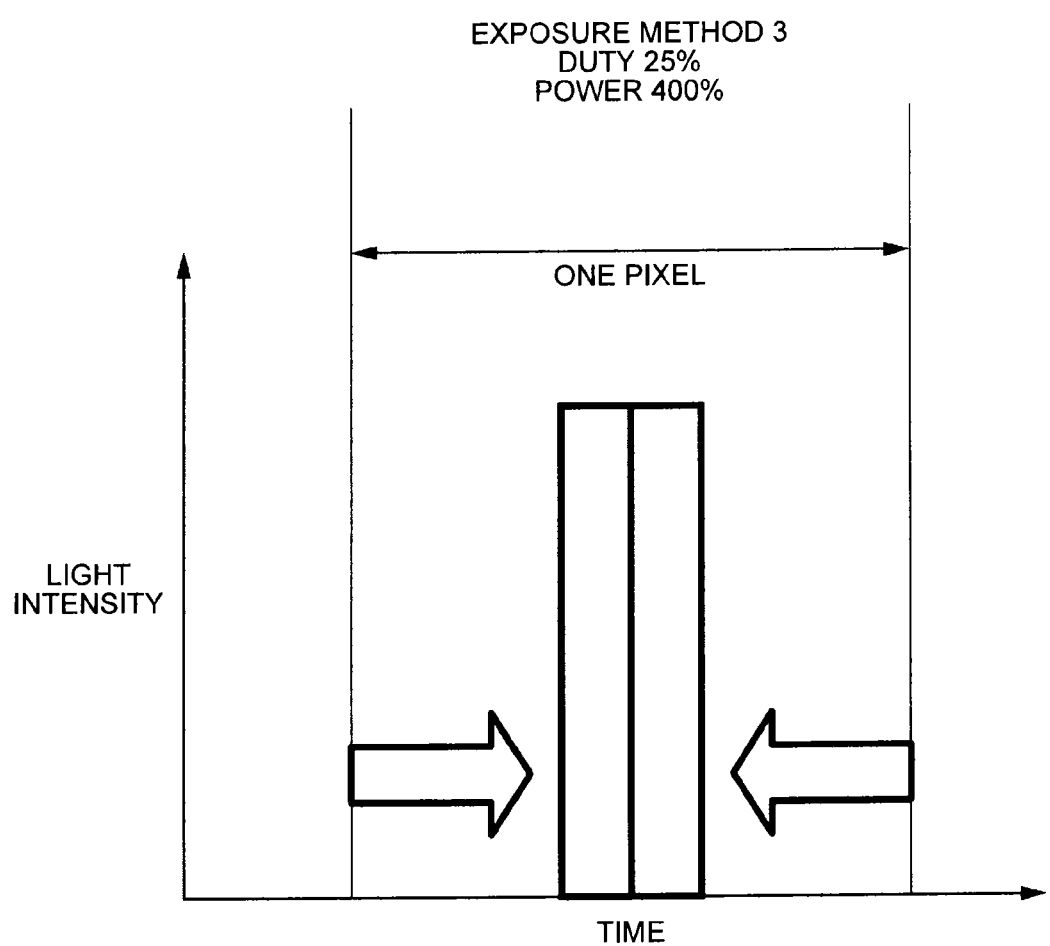
FIG. 15 is a schematic diagram illustrating another example of the image forming method.

FIG. 15 is a schematic diagram illustrating another example of the image forming method according to the present invention. As illustrated in the figure, in the exposure method (hereinafter, referred to as an "exposure method 3") according to the time concentration exposure according to the embodiment, the photoconductor is exposed with the target exposure output value being set to 400% of the light power value and with the target exposure time being set to a duty ratio of 25%. Here, if the width of the image portion is set to one, the width of the exposing section is 2/8 pixels.

Figure 16:
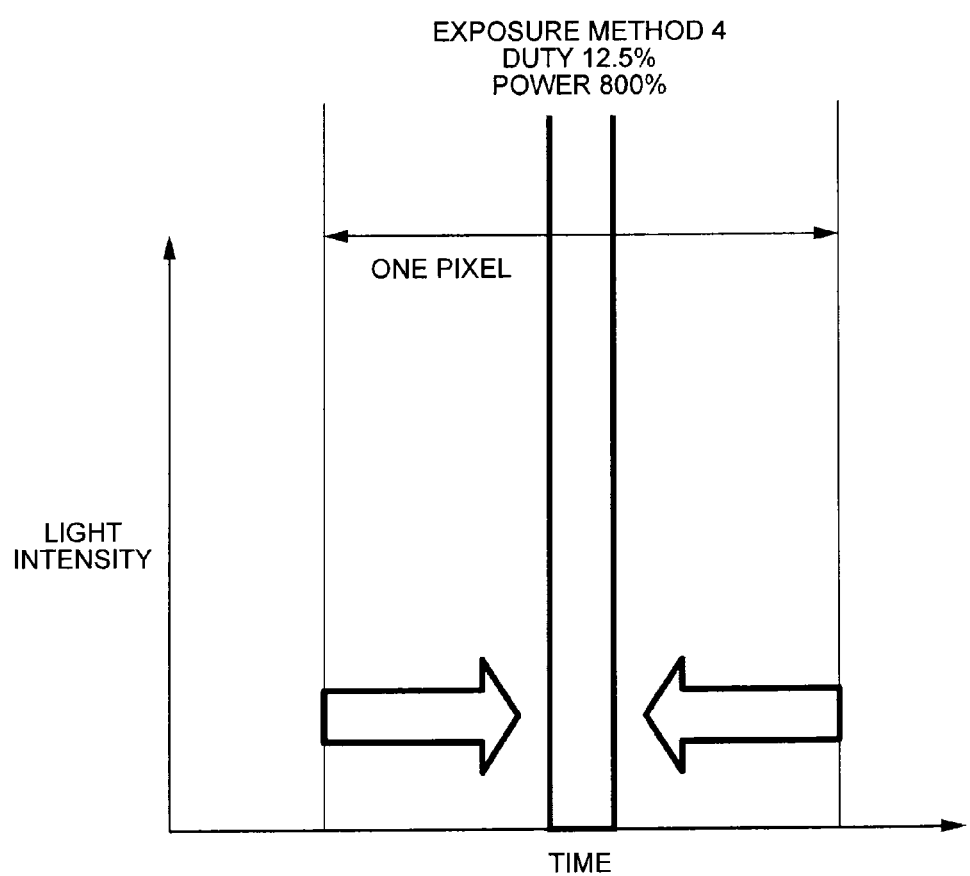
FIG. 16 is a schematic diagram illustrating a still further example of the image forming method.

FIG. 16 is a schematic diagram illustrating still another example of the image forming method according to the present invention. As illustrated in the figure, in the exposure method (hereinafter, referred to as an "exposure method 4") according to the time concentration exposure according to the embodiment, the photoconductor is exposed with target exposure output value being set to 800% of the light power value and with the target exposure time being set to a duty ratio of 12.5%. Here, when the width of the image portion is set to one, the width of the exposing section is 1/8 pixels.

In the above-described exposure methods 2 to 4, the pulse widths are smaller than that of the exposure method 1. That is, in the exposure methods 2 to 4, the formed latent image becomes small when the exposure is performed with the same light amount as that of the exposure method 1, and therefore the light amounts are controlled according to the pulse widths so that the integrated light amounts during the latent image formation period are equivalent to each other.

That is, in the exposure methods 2 to 4 according to the time concentration exposure, the exposure is performed with a small pulse width and a strong light intensity in comparison with the exposure method 1 according to the standard exposure.

Incidentally, in the description heretofore, in the exposure methods 2 to 4, the light power value is set so that the integrated light amount is constant. However, in the image forming method according to the present invention, it is not limited thereto.

In the embodiment, in the case where the beam spot diameter used for the exposure is 70 μm (main-scanning direction)×90 μm (sub-scanning direction), when the exposure is performed with a pulse width smaller than 1 pixel as described above, latent image formation capability is evaluated by the later-described evaluation method. By doing so, in the embodiment, the exposure method capable of improving the latent image resolution without changing the beam spot diameter used for the exposure is examined.

Figure 17:
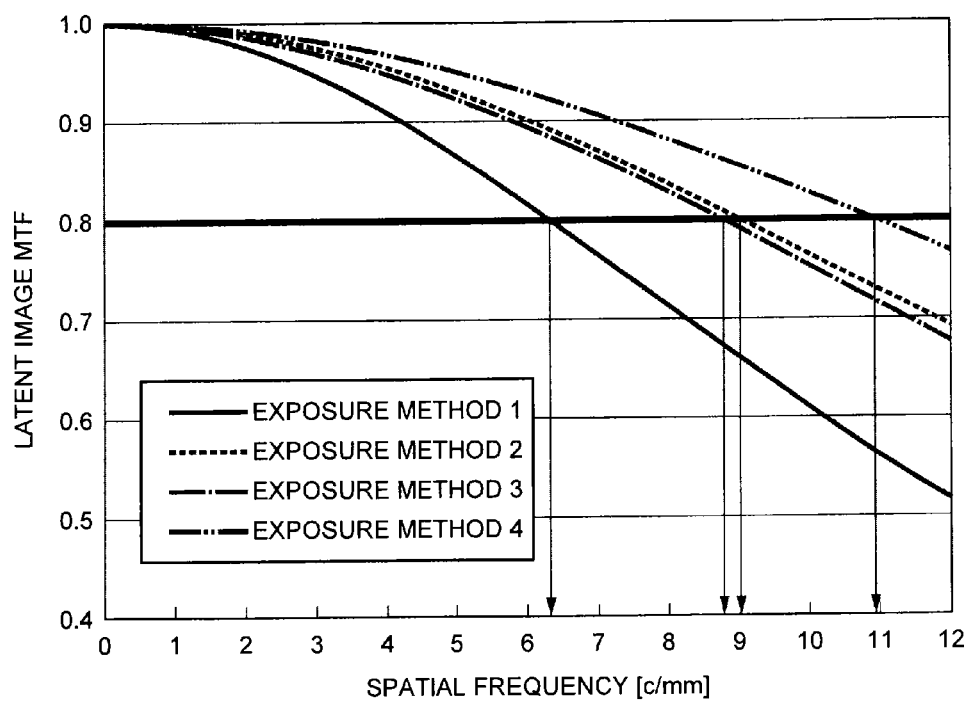
FIG. 17 is a graph illustrating spatial frequency characteristics according to a difference of the exposure methods.

FIG. 17 is a graph illustrating spatial frequency characteristics according to a difference of the exposure methods. As illustrated in the figure, in the exposure methods 2 to 4, a latent image Modulation Transfer Function (MTF) shows a high value up to a high frequency band in comparison with the exposure method 1.

The graph of FIG. 17 illustrates that, in the exposure methods 2 to 4, the smaller-diameter latent image can be stably formed in comparison with the exposure method 1. Particularly, it is illustrated that, among the exposure methods 2 to 4, the exposure method 4 where the pulse width is smallest is appropriate for the stable formation of the small-diameter latent image.

In addition, the graph of FIG. 1 illustrates that, in the exposure methods 2 to 4, since the exposure is performed with the small pulse width and the strong light intensity, the latent image resolution is improved in comparison with the exposure method 1. That is, it is illustrated that, according to the exposure methods 2 to 4 used for the image forming method according to the present invention, the small-diameter latent image can be stably formed in comparison with the exposure method 1 used for the image forming method of the related art.

Figure 18:
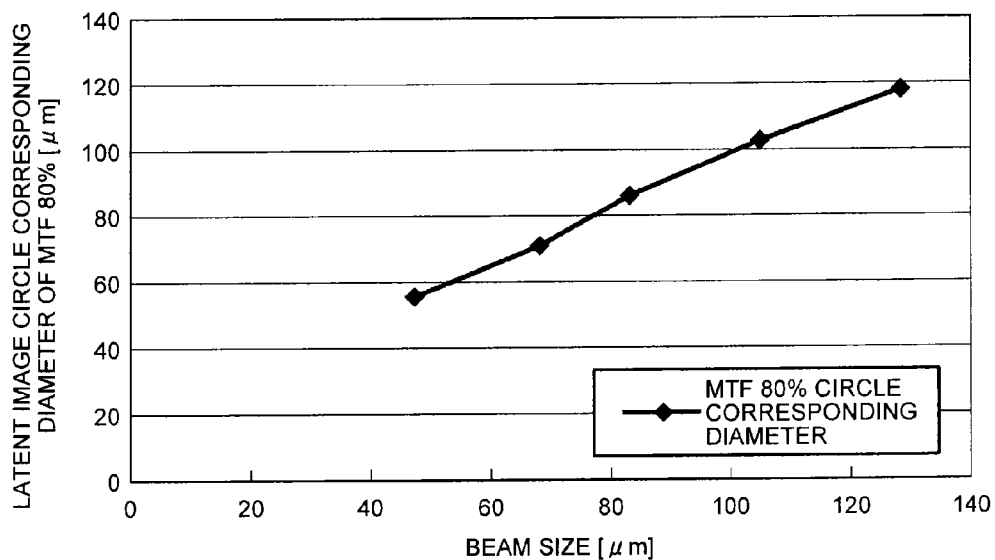
FIG. 18 is a graph illustrating a relationship between a latent image circle diameter and a beam spot diameter.

FIG. 18 is a graph illustrating a relationship between a latent image circle diameter and a beam spot diameter (beam size). The figure illustrates a relationship between a latent image circle corresponding diameter where a latent image MTF representing a latent image dot density is 80% and the beam spot diameter. As illustrated in the figure, the latent image resolution and the beam spot diameter change in proportion to each other.

In the image forming method according to the present invention, in the case where the stability of a latent image in a high-frequency region, that is, a latent image having a small diameter is emphasized, the exposure method according to the time concentration exposure has a superiority to the case where exposure is performed with a small beam spot diameter according to the exposure method of the related art. Here, the optimal beam spot diameter according to the difference of the output images is determined by the latent image MTF at the maximum spatial frequency required as the output image.

It should be further noted that the width of the latent image electric vector is narrow in comparison with other means and this means that the latent image electric vector is increased as well as the resolution is improved.

In addition, in the image forming method according to the present invention, unlike the case where the exposure is performed by controlling the light source through the power modulation or the pulse width modulation, the integrated light amount is equal to the case where the exposure is performed with the target exposure output value. For this reason, in the image forming method according to the present invention, the adhesion amount of toner or the total image density is not substantially different from the case where the exposure is performed with the target exposure output value.

Figure 19:
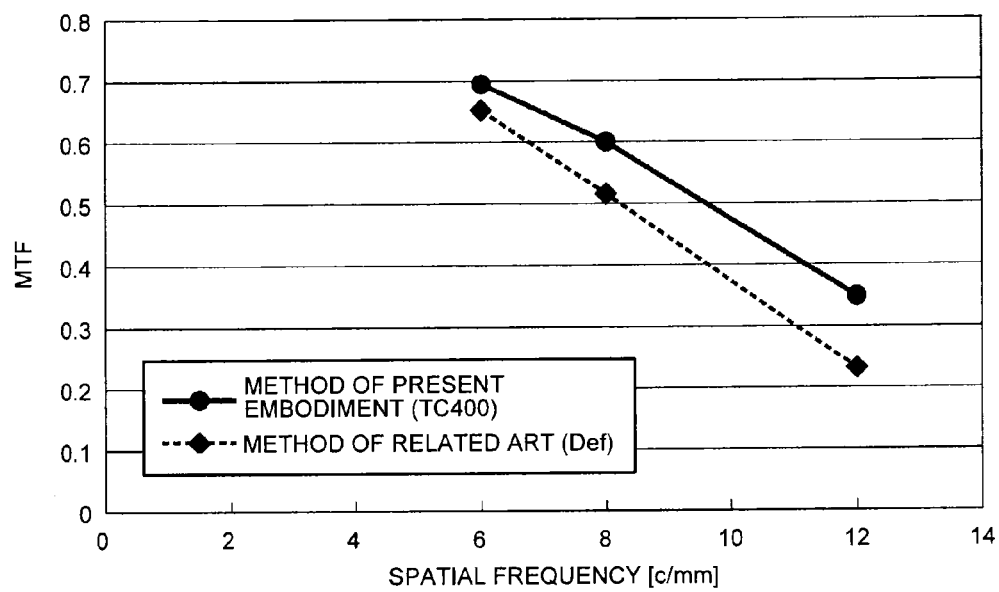
FIG. 19 is a graph illustrating a measurement result of an MTF in a longitudinal direction.

FIG. 19 is a graph illustrating a measurement result of a latent image MTF in a longitudinal direction. In the figure, the first light power value illustrated in FIG. 15 represents a value obtained by actually paper-outputting a vertical line image exposed with a value of 400% of a target exposure output value and MTF-analyzing. The figure illustrates that, with respect to any line width, the MTF of the exposure method according to the embodiment is higher than that of the exposure method of the related art.

Particularly, the effect that the MTF is increased as it goes to the high frequency is remarkable.

As described above, in the case of the PM modulation where the irradiation can be performed with a light power value P1 higher than a target exposure output value P0 at the time of forming a solid image density, a ratio (TCR) of light power values is defined as TCR=P1/P0.

In this case, in the exposure method according to the embodiment, a width of a longitudinal line is compressed to 1/TCR, and the exposure is performed with the light power value higher than the target exposure output value at the time of the solid image density. By doing so, according to the exposure method according to the embodiment, an image having a high MTF resolution can be formed.

In the exposure method according to the embodiment, the narrow range of the image portion where the image is to be formed in the image pattern is exposed by concentrating strong light. By doing so, in the exposure method according to the embodiment, the fidelity of the micro-sized output image pattern smaller than the beam diameter size (the influence of the size of the beam diameter cannot be ignored) can be improved, and the image pattern can be adjusted with a desired image density.

That is, according to the exposure method according to the embodiment, the output image compatibly realizing the formation of the micro-sized image pattern and the desired image density can be formed.

In addition, the exposure method according to the embodiment can be easily applied to any image pattern without performing any particular process such as edge detection or character information recognition.

Therefore, according to the exposure method according to the embodiment, even in the case where object information cannot be obtained from a computer when the image data are converted into the light source modulation data, the image pattern can be generated.

In addition, according to the exposure method according to the embodiment, the output image compatibly realizing the formation of the micro-sized image pattern and the desired image density can be formed without associating the image data and the light source modulation data for each character.

In addition, the exposure method according to the embodiment uses the PM+PWM modulation which is a combination of the Phase Modulation (PM) and the Pulse Width Modulation (PWM). In addition, according to the exposure method according to the embodiment, the integrated light amount of the image pattern during the exposing period may be the same value as the standard exposure by using the time concentration exposure where the maximum light power is intentionally set to be strong.

Here, according to the exposure method according to the embodiment, the resolution of the image pattern can be improved by forming a depth latent image without changing the image density of the image pattern.

In the exposure method according to the embodiment, the light power value is set such that the one or more pixels (pixel groups) inside the image portion existing at the boundary between the image portion and the non-image portion included in the image pattern become non-exposure pixels. Here, the group that is not exposed inside the image portion existing at the boundary between the image portion and the non-image portion included in the image pattern is called a non-exposure pixel group. In addition, in the exposure method according to the embodiment, the exposure is performed with the light power value obtained by adding the light power value for the pixel group adjacent to the non-exposure pixel group (in the vicinity of the non-exposure pixel group) and the light power value for the non-exposure pixel group.

By doing so, according to the exposure method according to the embodiment, the high-quality image pattern can be formed.

Example of Formation of Line Image

Next, an example of formation of a line image by the exposure method according to the embodiment will be described. In addition, in the description hereinafter, in the figure, the Y axis direction (main-scanning direction) is set to the horizontal direction, and the Z axis direction (sub-scanning direction) is set to the vertical direction.

Figure 20B:
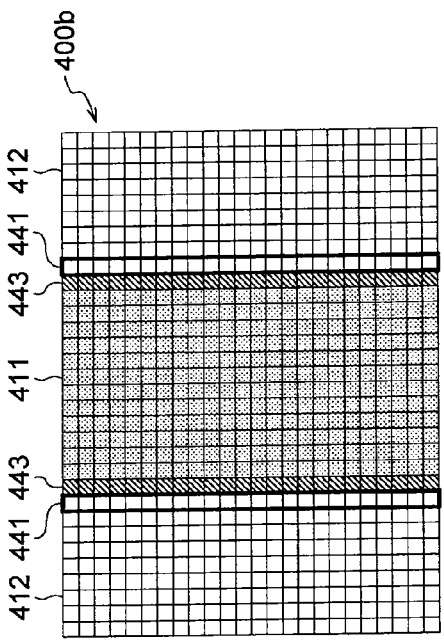
FIGS. 20A to 20D are schematic diagrams illustrating examples of exposure patterns of line images of a first exposure method according to the present invention.
Figure 20D:
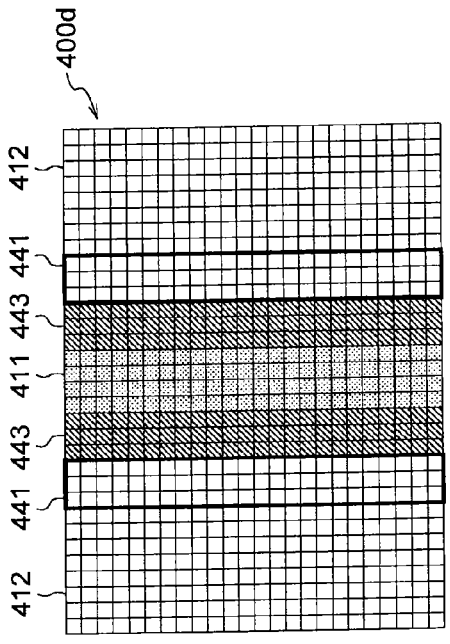
Figure 20A:
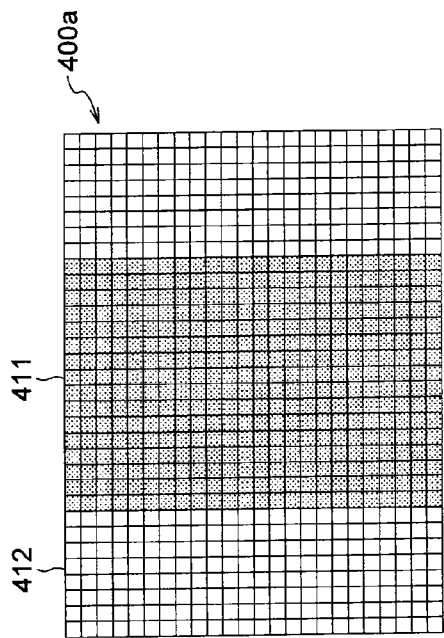

FIGS. 20A to 20D are schematic diagrams illustrating examples of the exposure patterns of line images in the first exposure method according to the present invention. FIG. 20A illustrates an exposure pattern 400*a* of a line image according to the standard exposure.

Figure 20C:
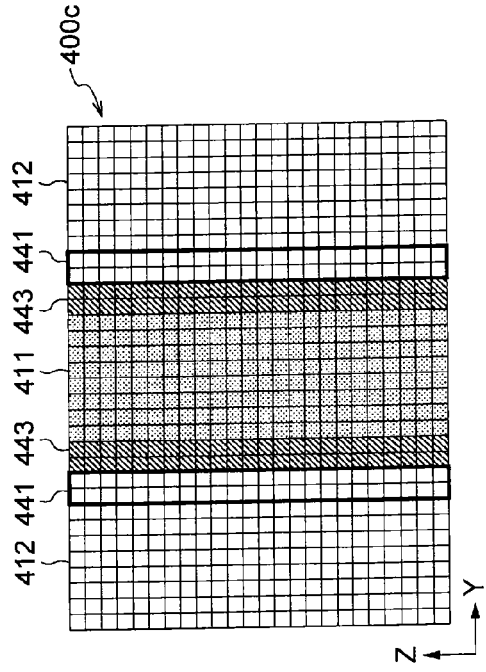

In addition, FIG. 20B illustrates an exposure pattern 400*b* of a line image where one dot at the boundary between the image portion and the non-image portion 412 is set to a high power exposure pixel group 443. In addition, FIG. 20C illustrates an exposure pattern 400*c* of a line image where two dots at the boundary between the image portion and the non-image portion 412 are set to a high power exposure pixel group 443. In addition, FIG. 20D illustrates an exposure pattern 400*d* of a line image where three dots at the boundary between the image portion and the non-image portion 412 are set to a high power exposure pixel group 443.

In all the exposure patterns 400*a*, 400*b*, 400*c*, and 400*d* illustrated in FIGS. 20A, 20B, 20C, and 20D, the minimum pixel is 4800 dpi, and the spatial frequency is 6 c/mm. In the exposure patterns 400*a*, 400*b*, 400*c*, and 400*d*, a bold longitudinal line (line in the Z axis direction) is formed every 8×8 dots (corresponding to 600 dpi).

That is, the exposure pattern 400*a* illustrated in FIG. 20A includes an exposure portion (matching with the image portion) 411 and a non-image portion 412 composed of two vertical lines having 600 dpi. Here, the size of one pixel is about 5 μm.

In the exposure method according to the embodiment, the light power value is set such that, in the exposure pattern 400*b*, the pixel groups (for example, a plurality of images where one pixel in the Y axis direction is arranged in one row in the Z axis direction) existing at the boundary between the image portion and the non-image portion 412 become the non-exposure portion 441. Here, also in the examples hereinafter, the non-exposure portion 441 corresponds to the above-described non-exposure pixel group. In addition, in the exposure method according to the embodiment, the pixel groups (for example, a plurality of the pixel groups where one pixel in the Y axis direction is arranged in one row in the Z axis direction) existing at the boundary between the exposure portion 411 and the non-exposure portion 441 are set as the high power exposure pixel group 443.

In addition, in the exposure method according to the embodiment, when a magnification ratio of the time concentration exposure to the standard exposure is 2, the high power exposure pixel group 443 is exposed with twice the light power. At this time, since the non-exposure portion 441 is not exposed, the integrated light amount of the entire exposure pattern 400b is the same as that of the exposure pattern 400a.

In addition, in the exposure method according to the embodiment, the number of pixels of the non-exposure portion 441 and the high power exposure pixel group 443 may be set to an arbitrary number of pixels in the main-scanning direction or the sub-scanning direction.

The exposure pattern 400c is set such that the non-exposure portion 441 and the high power exposure pixel group 443 have a width of two pixels in the Y axis direction. In addition, the exposure pattern 400d is set such that the non-exposure portion 441 and the high power exposure pixel group 443 have a width of three pixels in the Y axis direction.

FIG. 21 is a schematic diagrams illustrating examples of the light power values of the exposure patterns of the line images in FIGS. 20A to 20D. Here, FIG. 21 illustrates, at (a), the light power value of the exposure pattern 400a in FIG. 20A. In addition, FIG. 21 illustrates, at (b), the light power value of the exposure pattern 400b in FIG. 20B. In addition, FIG. 21 illustrates, at (c), superposition of the light power values illustrated at (a) and (b) in FIG. 21.

In FIG. 21, the horizontal axis denotes the dots in the Y axis direction in FIG. 10, and the vertical axis denotes the light power values of the respective dots. In addition, in the figure, numerical values in the dots denote multiples of the light power value.

As illustrated at (a) in FIG. 21, in the exposure pattern 400a according to the standard exposure, the multiples of the light power values of all the dots in the Y axis direction are one, and the exposure is performed with the uniform light power value.

On the other hand, as illustrated at (b) in FIG. 21, in the exposure pattern 400b according to the time concentration exposure, since the pixels (boundary pixels) existing at the boundary between the image portion and the non-image portion become the non-exposure portions, the multiples of the light power values of the non-exposure portions are zero (light power values are zero). In addition, in the exposure pattern 400b, since the pixels existing at the boundary between the image portion and the non-exposure portion become the high power exposure pixel groups, the multiples of the light power values of the high power exposure pixel groups are two.

In addition, as illustrated at (c) in FIG. 21, by comparing the waveform (a) of the light power value according to the standard exposure and the waveform (b) of the light power value according to the time concentration exposure, both ends portions of the waveform (a) according to the standard exposure become the non-exposure portions in the waveform (b) according to the time concentration exposure.

Next, the light power values of the non-exposure portion in the waveform (a) according to the standard exposure is added to the light power values of the high power exposure pixel groups corresponding to the both ends portions of the waveform (b) according to the time concentration exposure. That is, the high power exposure pixel group corresponds to, so to speak, a process of increasing the light power value of the end portion of the image pattern by folding the light power value inwards.

Figure 22:
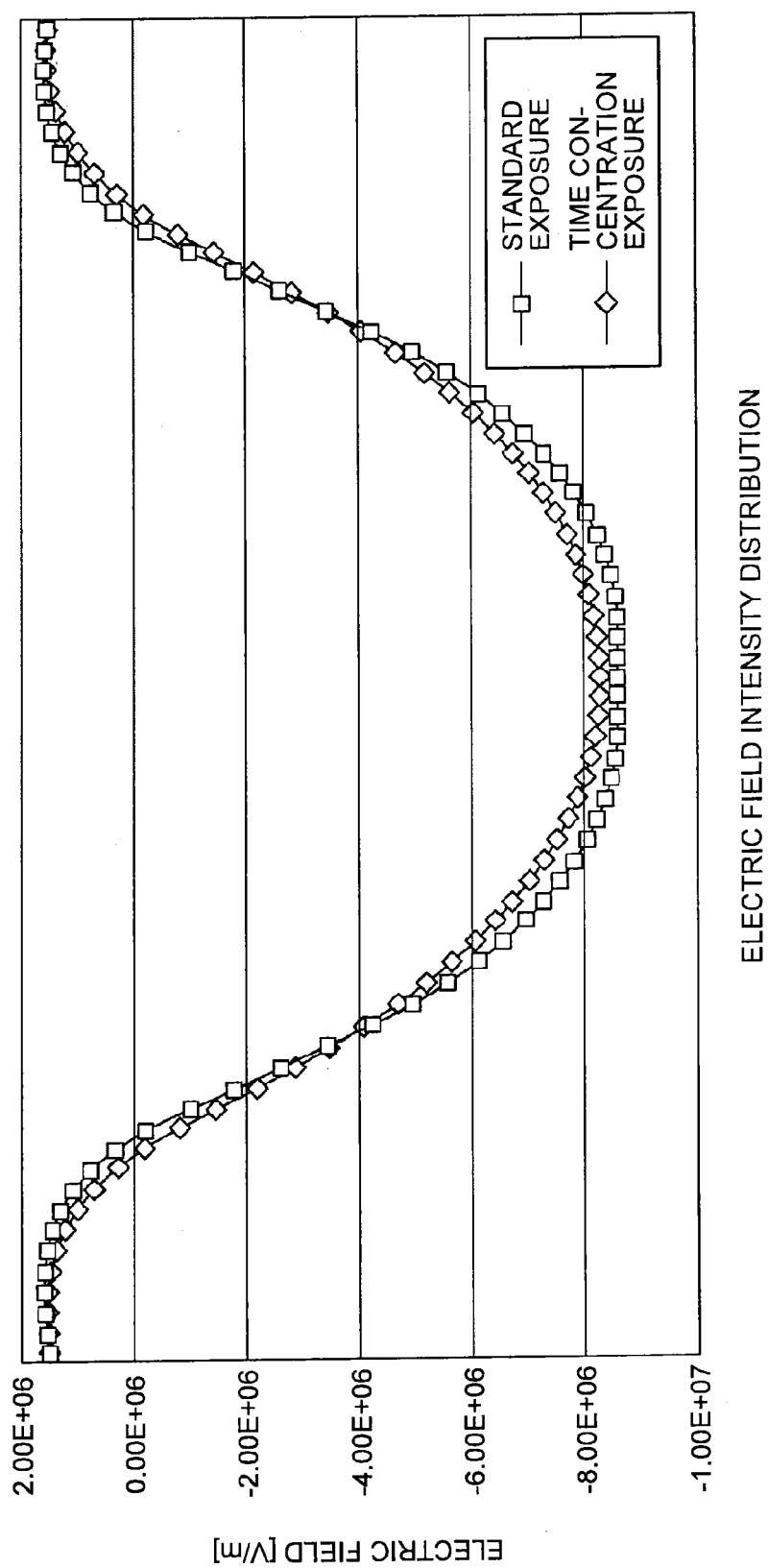
FIG. 22 is a graph illustrating electric field intensity distributions of latent images of the exposure patterns of FIGS. 20A to 20D.

FIG. 22 is a graph illustrating electric field intensity distributions of latent images of the exposure patterns of FIGS. 20A to 20D. The figure illustrates the electric field intensity distribution of latent image of the image portion according to the standard exposure and the electric field intensity distribution of latent image of the image portion according to the time concentration exposure where replacement of the non-exposure pixel group and the high power exposure pixel group for two dots is performed.

As illustrated in FIG. 22, by comparing the electric field intensity distribution of latent image according to the standard exposure and the electric field intensity distribution of latent image according to the time concentration exposure, it is found out that the time concentration exposure is useful for the image formation because the width of the peak portion of the electric field intensity is small and the slope of change of the electric field intensity is large (edge is steep).

Example of Formation of Dot Image

The exposure method according to the embodiment described above is not limited to the above-described line image, but it may be applied to a dot image or a character image.

Figure 23A:
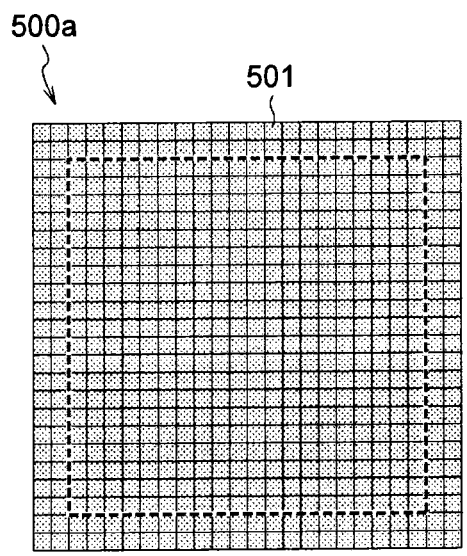
FIGS. 23A to 23D are schematic diagrams illustrating examples of the exposure patterns of the dot images of the first exposure method.

FIGS. 23A to 23D are schematic diagrams illustrating examples of exposure patterns of dot images in the first exposure method. FIG. 23A illustrates an exposure pattern 500a of a dot image according to the standard exposure. In FIG. 23A, in the exposure pattern 500a, the entire exposure portion 501 is an image portion which is exposed with a uniform light power value, and the outside of the frame of the image portion is a non-image portion.

Here, as illustrated in FIG. 23A, the exposure pattern 500a is a square of 24 dots of 4800 dpi (three dots when converted to 600 dpi).

Figure 23B:
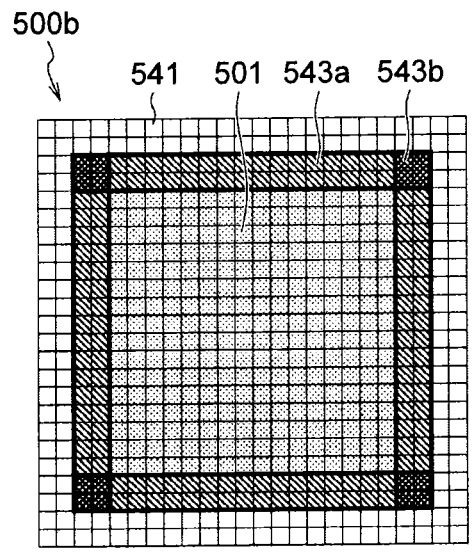
Figure 23C:
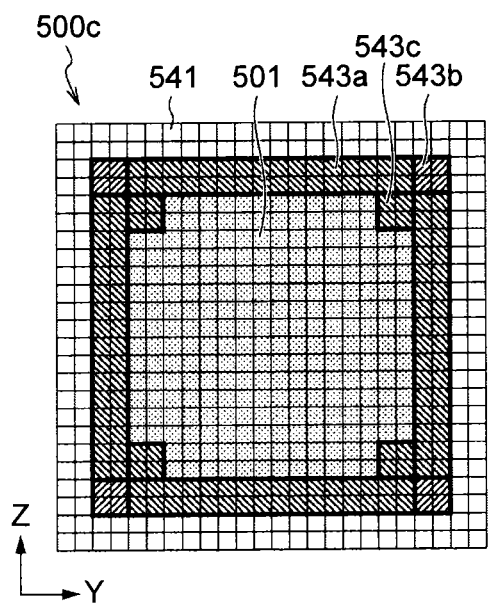
Figure 23D:
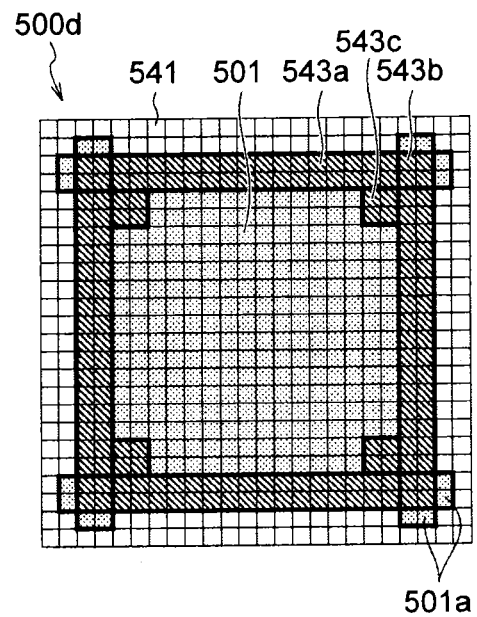

In addition, FIG. 23B illustrates an exposure pattern 500b of a dot image where two dots existing at the boundary with respect to the non-exposure portion 541 are set to high power exposure pixel groups 543a and 543b. In addition, FIG. 23C illustrates another example of an exposure pattern 500c of a line image where two dots existing at the boundary with respect to the non-exposure portion 541 are set to the high power exposure pixel groups 543a and 543b. In addition, FIG. 23D illustrates still another example of an exposure pattern 500d of a line image where two dots existing at the boundary with respect to the non-exposure portion 541 are set to the high power exposure pixel groups 543a, 543b, and 543c.

As illustrated in FIG. 23B, in the exposure pattern 500b, among the pixels of the image portion, the two dots of the both ends in the Y and Z axis directions are set to the non-exposure portion 541. In addition, the high power exposure pixel groups 543a, 543b, and 543c of the exposure pattern 500b are added with the light power values of the pixels corresponding to the two dots in the Y and Z directions adjacent to the exposure portion 501 and the non-image portion.

In this case, since the light power values of the high power exposure pixel groups 543b of the four corners of the exposure portion are added with the light power values of both the non-exposure portions 541 in the Y and Z axis direction, the light power values of the high power exposure pixel groups are four times the light power value of the exposure portion 501 (twice the light power value of the high power exposure pixel group 543a).

However, in the image forming apparatus performing the exposure method according to the embodiment, in some cases, it may be difficult to set the light power value to four times the light power value of the standard exposure.

In this case, the maximum value (hereinafter, referred to as a "maximum light power value") of the light power value is set in advance, and the light power value can be limited within a range up to the maximum light power value. For example, the maximum light power value may be set to be three times or twice the light power value of the standard exposure.

In the case of setting the maximum light power value in this manner, the integrated light amount is slightly changed in comparison with the case of the standard exposure. However, it can be said that since the occupation ratio of the pixels influenced by the maximum light power value to the entire pattern is small, the image density of the formed image is not greatly changed.

However, in the case where the dot size of the image pattern is small and the number of pixels used for the high power exposure pixel group is large, the occupation ratio of the pixels influenced by the maximum light power value cannot be ignored, the appropriateness thereof may be selected based on the balance of the cost for implementation and the image quality required.

FIG. 23C illustrates an exposure pattern 500c in the case where the maximum light power value is set to be three times the light power value of the standard exposure. As illustrated in the figure, in the exposure pattern 500c, the light power value of the high power exposure pixel group 543b which is to be exposed with four times the light power value of the standard exposure in the original case is set to be three times the light power value of the standard exposure.

Here, in the exposure pattern 500c, in order to equalize the integrated light amount with that of the standard exposure, the light power value is dispersed such that a portion of the pixels which are adjacent to the high power exposure pixel group 543b and do not reach the maximum light power value, are placed in the exposure portion 501 as the high power exposure pixel group 543c.

FIG. 23D illustrates an exposure pattern 500d in the case where the maximum light power value is set to be twice the light power value of the standard exposure. As illustrated in the figure, in the exposure pattern 500d, the light power value of the high power exposure pixel group 543b which is to be exposed with four times the light power value of the standard exposure in the original case is set to be twice the light power value of the standard exposure as in the high power exposure pixel group 543a.

Here, in the exposure pattern 500d, in order to equalize the integrated light amount with that of the standard exposure, the light power value is dispersed to the exposure portion 501a in the non-exposure portion 541 which are pixels that are adjacent to the high power exposure pixel group 543b and do not reach the maximum light power value, as well as the high power exposure pixel group 543c.

Figure 24A:
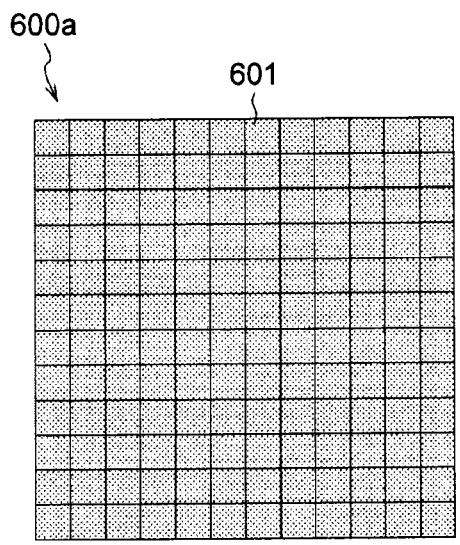
FIGS. 24A to 24D are schematic diagrams illustrating other examples of the exposure patterns of the dot images of the first exposure method.

FIGS. 24A to 24D are schematic diagrams illustrating other examples of the exposure patterns of the dot images in the first exposure method. FIG. 24A illustrates an exposure pattern 600a of a dot image according to the standard exposure. In FIG. 24A, in the exposure pattern 600a, the entire exposure portion 601 is an image portion which is exposed with a uniform light power value, and the outside of the frame of the image portion is a non-image portion.

Here, as illustrated in FIG. 24A, the exposure pattern 600a is a square of 12 dots having 4800 dpi.

Figure 24B:
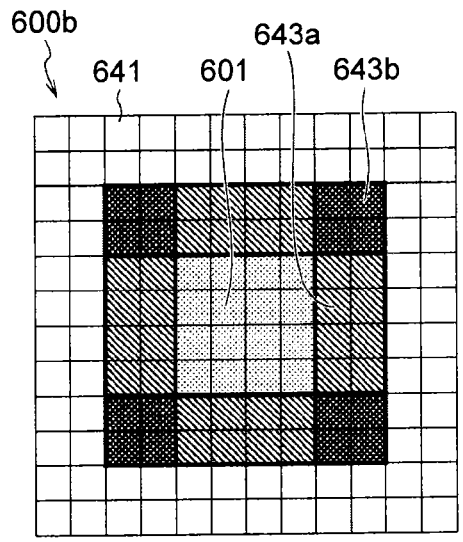
Figure 24C:
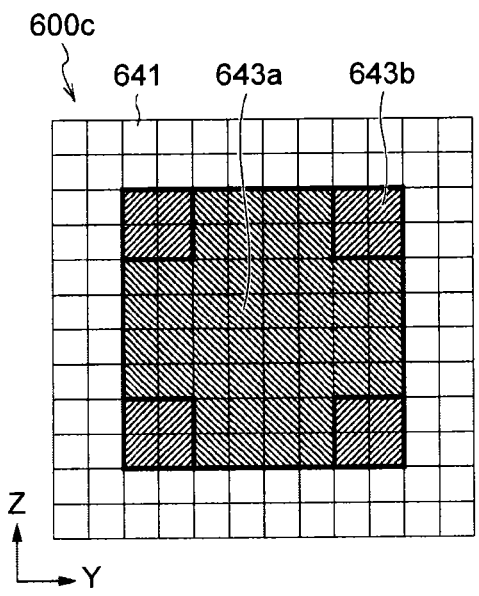
Figure 24D:
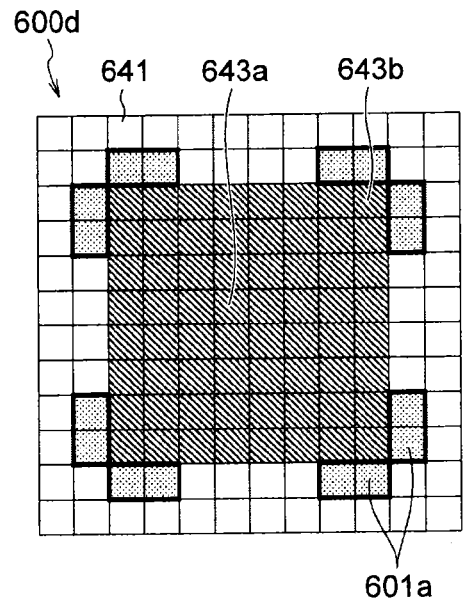

In addition, FIG. 24B illustrates an exposure pattern 600b of a dot image where two dots existing at the boundary with respect to the non-exposure portion 641 are set to high power exposure pixel groups 643a and 643b. In addition, FIG. 24C illustrates an example of an exposure pattern 600c of a line image where the entire exposure portion including two dots existing at the boundary with respect to the non-exposure portion 641 are set to the high power exposure pixel group 643a. In addition, FIG. 24D illustrates still another example of an exposure pattern 600d of a line image where two dots existing at the boundary with respect to the non-exposure portion 641 are set to the high power exposure pixel group 643a.

As illustrated in FIG. 243, in the exposure pattern 600b, among the pixels of the image portion, the two dots of the both ends in the Y and Z axis directions are set to the non-exposure portion 641. In addition, the high power exposure pixel groups 643a and 643b of the exposure pattern 600b are added with the light power values of the pixels corresponding to the two dots in the Y and Z directions adjacent to the exposure portion 601 and the non-image portion.

In this case, since the light power values of the high power exposure pixel group 643b of the four corners of the exposure portion are added with the light power values of both the non-exposure portions 641 in the Y and Z axis directions, the light power values of the high power exposure pixel group are four times the light power value of the exposure portion 601 (twice the light power value of the high power exposure pixel group 643a).

FIG. 24C illustrates an exposure pattern 600c in the case where the maximum light power value is set to be three times the light power value of the standard exposure. As illustrated in the figure, in the exposure pattern 600c, the light power value of the high power exposure pixel group 643b which is to be exposed with four times the light power value of the standard exposure in the case of the exposure pattern 600b is set to be three times the light power value of the standard exposure.

Here, in the exposure pattern 600c, in order to equalize the integrated light amount with that of the standard exposure, the light power value is dispersed to the high power exposure pixel group 643a. That is, in the exposure pattern 600c, the entire exposure portion is set to the high power exposure pixel group 643a which is exposed with three times the light power value of the standard exposure.

FIG. 24D illustrates an exposure pattern 600d in the case where the maximum light power value is to be twice the light power value of the standard exposure. As illustrated in the figure, in the exposure pattern 600d, the entire exposure portion is set to the high power exposure pixel group 643a.

Here, in the exposure pattern 600d, in order to equalize the integrated light amount with that of the standard exposure, the light power value is dispersed to the exposure portion 601a in the non-exposure portion 641 which are the pixels which are adjacent to the high power exposure pixel group 643a and do not reach the maximum light power value.

Figure 25A:
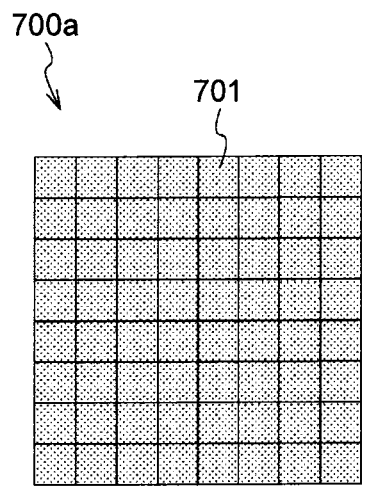
FIGS. 25A to 25C are schematic diagrams illustrating still other examples of the exposure patterns of the dot images of the first exposure method.
Figure 25B:
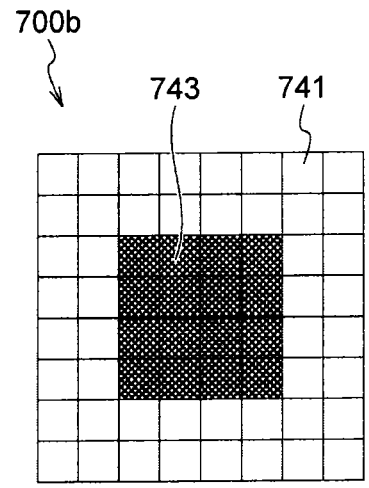
Figure 25C:
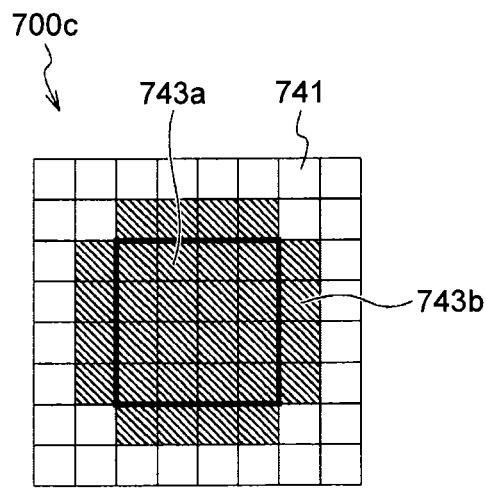

FIGS. 25A to 25C are schematic diagrams illustrating still other examples of exposure patterns of dot images in the first exposure method. FIG. 25A illustrates an exposure pattern 700a of a dot image according to the standard exposure. In FIG. 25A, in the exposure pattern 700a, the entire exposure portion 701 is an image portion which is exposed with a uniform light power value, and the outside of the frame of the image portion is a non-image portion.

Here, as illustrated in FIG. 25A, the exposure pattern 700a is a square of eight dots of 4800 dpi (one dot when converted to 600 dpi).

In addition, FIG. 25B illustrates an exposure pattern 700b of a dot image where two dots existing at the boundary with respect to the non-exposure portion 741 are set to be a high power exposure pixel group 743. In addition, FIG. 15C illustrates another example of an exposure pattern 700c of a line image where the entire exposure portion including two dots existing at the boundary with respect to the non-exposure portion 741 is set to be a high power exposure pixel group 743a.

As illustrated in FIG. 25B, in the exposure pattern 700b, among the pixels of the image portion, the two dots of the both ends in the Y and Z axis directions are set to the non-exposure portion 741. That is, the high power exposure pixel group 743 of the exposure pattern 700b is added with the light power values of the pixels corresponding to the two dots in the Y and Z axis directions of the non-exposure portion 741 over the entire exposure portion.

In this case, since the light power value of the high power exposure pixel group 743 is added with the light power values of the both ends of the non-exposure portion 741 in the Y and Z axis directions, the light power value of the high power exposure pixel group is four times the light power value of the exposure portion 701 of the exposure pattern 700a.

FIG. 25C illustrates an exposure pattern 700c in the case where the maximum light power value is set to be twice the light power value of the standard exposure. As illustrated in the figure, in the exposure pattern 700c, the light power values of the high power exposure pixel groups 743a and 743b which are to be exposed with four times the light power value of the standard exposure in the exposure pattern 700b are set to be twice the light power value of the standard exposure.

Here, in the exposure pattern 700c, in order to equalize the integrated light amount with that of the standard exposure, the light power value is dispersed to the high power exposure pixel group 743b. That is, in the exposure pattern 600c, in order to equalize the integrated light amount with that of the standard exposure, the light power value is dispersed to the high power exposure pixel group 743b in the non-exposure portion 741 which are the pixels which are adjacent to the high power exposure pixel group 743a and do not reach the maximum light power value. Example of Image Having Bent portion FIGS. 26A to 26D are schematic diagrams illustrating examples of exposure patterns of images having a bent portion in the first exposure method. These figures illustrate examples of pinched shaped image patterns having a bent portion which is assumed as a more general image pattern. In the case of such an image pattern, one image pattern may be divided into two or more image patterns for processing. The figure illustrates an example where three light power values are set by uniformly distributing the light power value of one image pattern to two places.

Figure 26A:
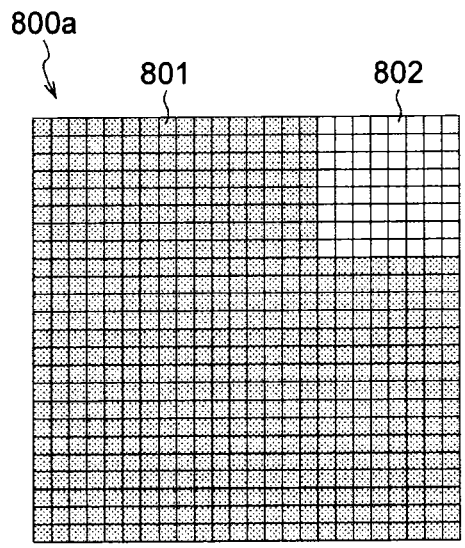
FIGS. 26A to 26D are schematic diagrams illustrating examples of the exposure patterns of images having a bent portion of the first exposure method.

FIG. 26A illustrates an exposure pattern 800a of an image according to the standard exposure. In FIG. 26A, in the exposure pattern 800a, the entire exposure portion 801 is an image portion which is exposed with a uniform light power value, and the outside of the frame of the image portion is a non-image portion 802.

Here, as illustrated in FIG. 26A, the exposure pattern 800a is a square of 24 dots of 4800 dpi (three dots when converted to 600 dpi).

Figure 26B:
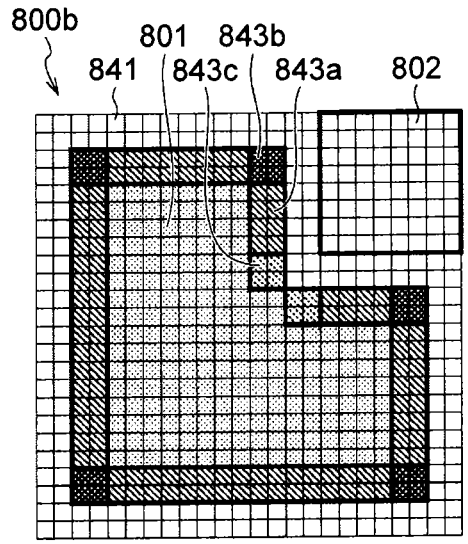
Figure 26C:
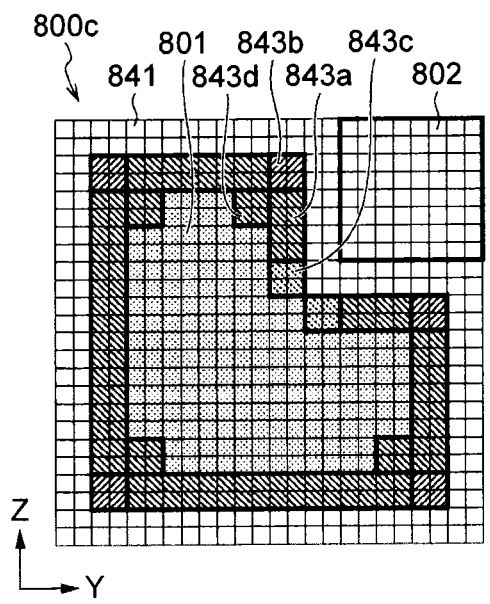
Figure 26D:
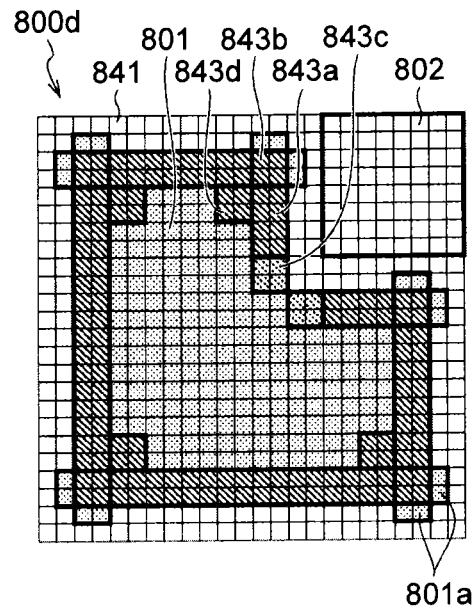

In addition, FIG. 26B illustrates an exposure pattern 800b of a dot image where two dots existing at the boundary with respect to the non-exposure portion 841 are set to be high power exposure pixel groups 843a and 843b. In addition, FIG. 26C illustrates another example of an exposure pattern 800c of a line image where two dots existing at the boundary with respect to the non-exposure portion 841 are set to be the high power exposure pixel groups 843a and 843b. In addition, FIG. 26D illustrates still another example of an exposure pattern 800d of a line image where two dots existing at the boundary with respect to the non-exposure portion 841 are set to be the high power exposure pixel groups 843a and 843b.

As illustrated FIG. 26B, in the exposure pattern 800b, among the pixels of the image portion, the two dots of the both ends in the Y and Z axis directions are set to the non-exposure portion 841. In addition, the high power exposure pixel groups 843a and 843b of the exposure pattern 800b are added with the light power values of the pixels which are adjacent to the exposure portion 801 and the non-exposure portion 841 and are for the two dots in the Y and Z axis directions.

In this case, since the light power values of the high power exposure pixel group 843b of the four corners of the exposure portion 801 are added with the light power values of both the non-exposure portions 841 in the Y and Z axis directions, the light power values of the high power exposure pixel group are four times the light power values of the exposure portion 801 (twice the light power value of the high power exposure pixel group 843a).

In addition, in the bent portion of the exposure pattern 800b, the light power value of the non-exposure portion 841 is dispersed to plural places. Therefore, the light power value of the high power exposure pixel group 843c is 1.5 times the light power value of the exposure portion 801.

FIG. 26C illustrates an exposure pattern 800c in the case where the maximum light power value is set to three times the light power value of the standard exposure. As illustrated in the figure, similarly to the exposure pattern 500c described above, in the exposure pattern 800c, the light power values are dispersed by placing the high power exposure pixel group 843c in the exposure portion 801.

FIG. 26D illustrates an exposure pattern 800d in the case where the maximum light power value is set to twice the light power value of the standard exposure. As illustrated in the figure, similarly to the exposure pattern 500d described above, in the exposure pattern 800d, the light power values are dispersed to the exposure portion 801a in the non-exposure portion 841.

Flowchart of Exposure Method

Figure 27:
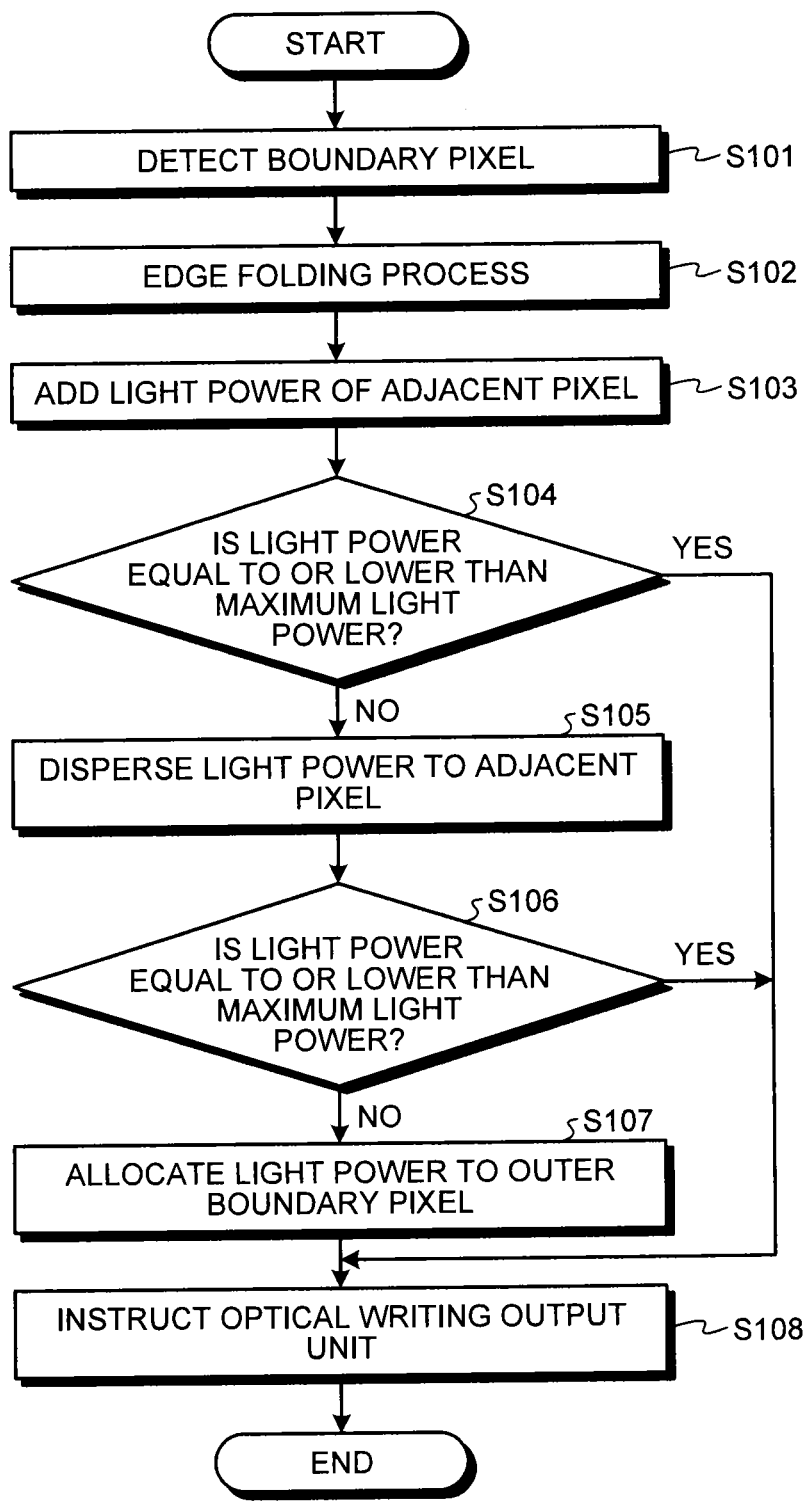
FIG. 27 is a flowchart of an exposure method according to an embodiment.

FIG. 27 is a flowchart of the exposure method according to the embodiment. As illustrated in the figure, the light source modulation data generating circuit 407 performing the exposure method according to the embodiment receives the image pattern from the information processing device generating the image pattern and detects an arbitrary number of pixels (boundary pixels) existing at the boundary portion between the image portion and the non-image portion from the image pattern (Step S101).

The light source modulation data generating circuit 407 performs an edge folding process to specify the non-exposure portion on the detected boundary pixels (Step S102).

In order to expose the pixels (adjacent pixels) existing at the boundary portion between the non-exposure portion and the exposure portion, as the high power exposure pixel group, the light source modulation data generating circuit

407 performs a process of adding the light power value for exposing the non-exposure portion (Step S103).

The light source modulation data generating circuit 407 determines whether or not the light power value of the high power exposure pixel group of the exposure pattern is equal to or lower than the maximum light power value (Step S104).

When the light power value of the high power exposure pixel group is equal to or lower than the maximum light power value (Yes in Step S104), the light source modulation data generating circuit 407 proceeds to the process of Step S108.

When the light power value of the high power exposure pixel group is higher than the maximum light power value (No in Step S104), the light source modulation data generating circuit 407 disperse the light power value to the high power exposure pixel group of a light power value higher than the maximum light power value to generate a new high power exposure pixel group (Step S105).

The light source modulation data generating circuit 407 determines whether or not the light power value of the high power exposure pixel group of the exposure pattern after the dispersion of the light power value is equal to or lower than the maximum light power value (Step S106).

When the light power value of the high power exposure pixel group is equal to or lower than the maximum light power value (Yes in Step S106), the light source modulation data generating circuit 407 proceeds to the process of Step S108.

When the light power value of the high power exposure pixel group is higher than the maximum light power value (No in Step S106), the light source modulation data generating circuit 407 allocates the light power value to the pixels in the non-exposure portion (outer boundary) which is adjacent to the high power exposure pixel group of the light power value equal to or higher than the maximum light power value and generates a new exposure portion (Step S107).

After the setting process of the high power exposure pixel group to the exposure pattern and the dispersion and allocation process of the light power value, the light source modulation data generating circuit 407 outputs (instructs) the generated exposure pattern to the optical writing output unit (Step S108) and terminates the process.

As described heretofore, according to the exposure method according to the embodiment, the images of various shapes can be formed as print materials having a high image quality.

Exposure Method (2)

Next, a second exposure method of the image forming method according to the present invention will be described mainly with respect to a difference from the above-described exposure method.

The second exposure method is another example of a process of adding light power values of pixels existing at the boundary between the image portion and the non-image portion to the exposure portion. That is, in the exposure method according to the second embodiment, the light power value addition process is not performed on the pixels where the high power exposure pixel group reaches the maximum light power value, and the original exposure pattern is exposed.

FIGS. 28A to 28D are schematic diagrams illustrating examples of exposure patterns of dot images in the second exposure method.

Figure 28A:
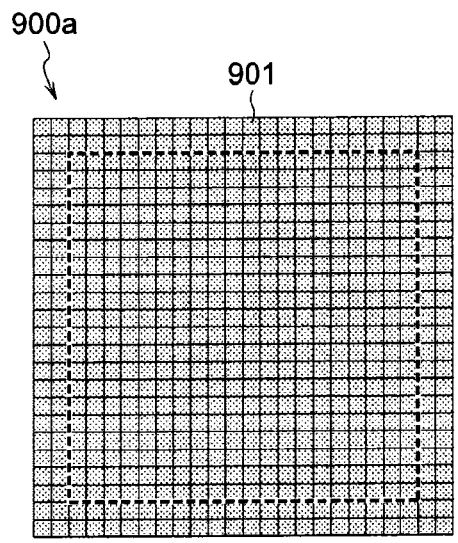
FIGS. 28A to 28D are schematic diagrams illustrating examples of exposure patterns of dot images of a second exposure method.

FIG. 28A illustrates an exposure pattern 900a of a dot image according to the standard exposure. In FIG. 28A, in the exposure pattern 900a, the entire exposure portion 901 is an image portion which is exposed with a uniform light power value, and the outside of the frame of the exposure portion 901 is a non-image portion.

Here, as illustrated in FIG. 28A, the exposure pattern 900a is a square of 24 dots of 4800 dpi (three dots when converted to 600 dpi).

Figure 28B:
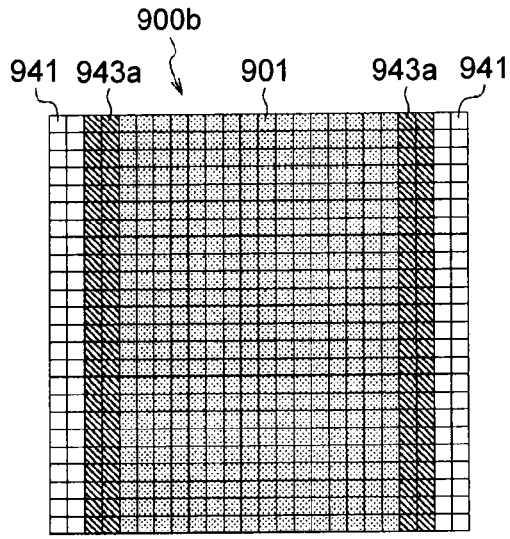
Figure 28C:
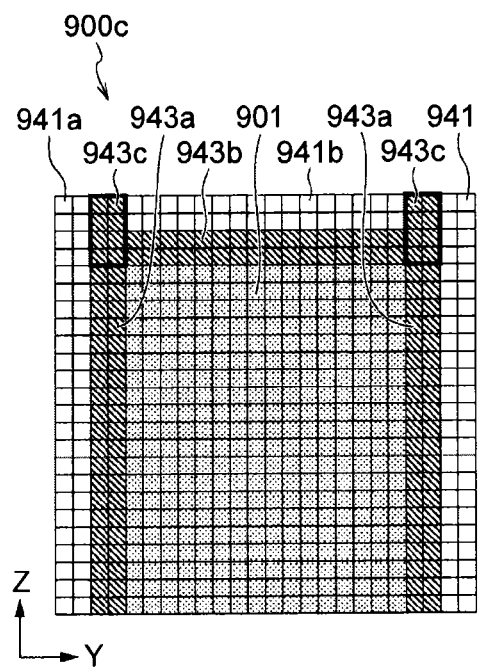
Figure 28D:
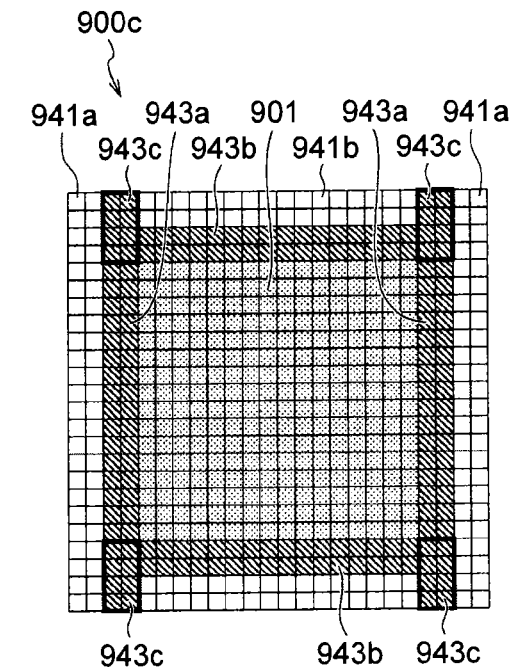

FIG. 28B illustrates an exposure pattern 900b of a dot image where two dots existing at the boundary with respect to the non-exposure portion 941 are set to high power exposure pixel groups 943a and 943b. In addition, FIG. 28C illustrates another example of an exposure pattern 900c of a line image where two dots existing at the boundary with respect to the non-exposure portion 941 are set to a high power exposure pixel group 943. In addition, FIG. 28D illustrates still another example of an exposure pattern 900d of a line image where two dots existing at the boundary with respect to the non-exposure portion 941 are set to high power exposure pixel groups 943a, 943b, and 943c.

Here, in the exposure method according to the embodiment, the time concentration exposure is performed with 200% of the light power value of the standard exposure, and the upper limit of the maximum light power value is set to twice the light power value of the standard exposure. During the exposure, the scanning direction is sequentially repeated in order of the Y axis direction (left→right) and, after that, the Z axis direction (up→down).

As illustrated in FIG. 28B, in the exposure pattern 900b, among the pixels of the image portion, the two dots of the both ends in the Y axis direction are set to a non-exposure portion 941. In addition, the light power value of the high power exposure pixel group 943a of the exposure pattern 900b is added with the light power values of the pixels which are adjacent to the exposure portion 901 and the non-image portion and are for the two dots in the Y axis direction. In this case, since the light power value of the high power exposure pixel groups 943a of the both ends already reach the above-described maximum light power value, the addition of the light power value in the Z axis direction is not performed.

FIG. 28C illustrates an exposure pattern 900c in the case where the high power exposure pixel group 943b is placed in the one end in the Z axis direction of the exposure portion 901. In addition, FIG. 28D illustrates an exposure pattern 900d in the case where the high power exposure pixel groups 943b are placed in the both ends in the Z axis direction of the exposure portion 901.

Here, in the case where the high power exposure pixel group 943b is also placed in the Z axis direction, since the high power exposure pixel group 943 is placed in the Y axis direction, the light power value exceeds the maximum light power value if the light power value of the non-exposure portion 941b is simply added to the light power values of the high power exposure pixel groups 943c at corner portions.

Therefore, in the exposure method according to the embodiment, with respect to the high power exposure pixel group 943c of a light power value that exceeds the maximum light power value, the light power value addition process is not performed.

By doing so, since the maximum light power cannot be exceeded, the exposure method according to the embodiment can be performed on various image patterns without exception.

In addition, although the shapes of the exposure patterns 900c and 900d of FIGS. 28C and 28D appear to be different from that of the exposure pattern 900a having the same shape as the original image pattern, since the added amount of the light power value is sufficiently small in comparison with the beam size, an image such as a protrusion may not be formed.

That is, according to the exposure method according to the embodiment, substantially, an output image equivalent to the image obtained by exposing corner portions of the dot image with four times the light power value can be formed.

In thinning or thickening of an exposure pattern performed in the related art, since image data are reduced for the thinning or thickening, the image becomes thin.

In addition, in the thinning or thickening of the exposure pattern performed in the related art, if the image data are too much reduced, the data may disappear. Therefore, in order to cope with a small-sized image pattern, an exception process is needed, and thus, the coping is difficult.

On the contrary, in the exposure method according to the embodiment, without reducing the light power value of the exposure pattern according to the image data, the light power value is added (moved) to other pixels as a high power exposure pixel group. That is, according to the exposure method according to the embodiment, without blurring an image, a high-quality image can be formed.

Exposure Method (3)

Next, an example of a third exposure method of the image forming method according to the present invention will be described mainly with respect to a difference from the example of the above-described exposure method.

In the exposure method according to the embodiment, the number of pixels in the non-exposure portion or the high power exposure pixel group may be used selectively according to the performance of the image forming apparatus, the image area in the image pattern, the shape (black character, outline character, line type, image shape, or the like) of the image pattern.

FIGS. 29A to 29D are schematic diagrams illustrating examples of light power value addition processes for exposure patterns in the third exposure method. As illustrated in the figure, in the exposure method according to the embodiment, one to four dots of the exposure patterns of the images formed with 4800 dpi are set to the non-exposure portions, and the light power values are added to other pixels. In the figure, "0" represents the non-exposure pixel (light power value is zero), "1" and "2" represent exposure pixels (coefficient of the light power value is one or two), and "x" represents an arbitrary pixel.

Here, a process of adding only one dot is defined as a 1-dot process mode, and a process of adding two dots is defined as a 2-dot process mode. Hereinafter, according to the number of dots where the light power value is added to other dots, the mode name of the process mode is varied.

Figure 29A:
FIGS. 29A to 29D are schematic diagrams illustrating examples of addition processes of light power values of exposure patterns of a third exposure method.
Figure 29B:
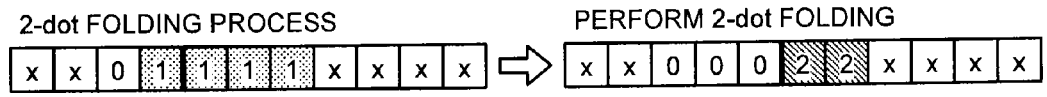
Figure 29C:
Figure 29D:

FIG. 29A illustrates an example of the addition of a 1-dot folding process. In addition, FIG. 29B illustrates an example of the addition of a 2-dot folding process. In addition, FIG. 29C illustrates an example of the addition of a 3-dot folding process. In addition, FIG. 29D illustrates an example of the addition of a 4-dot folding process.

As illustrated in FIGS. 29A to 29D, in the exposure method according to the embodiment, with respect to an arbitrary number of the exposure pixels which are arrayed symmetrically, pattern matching is performed to determine whether or not the exposure pixels exist at the corresponding positions when the folding is performed about a virtual symmetric axis. In this manner, the pattern matching is performed, and the light power value is added to the pixel of the counter side about the symmetric axis, so that the numeric value of the exposure pixel of the counter side becomes "2".

Figure 30A:
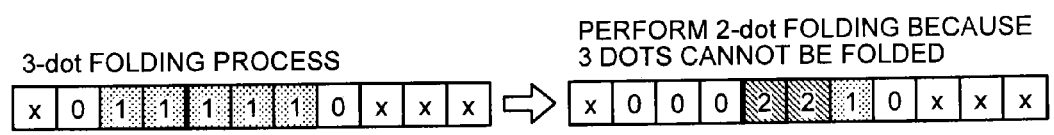
FIGS. 30A and 30B are schematic diagrams illustrating other examples of the addition processes of the light power values of the exposure patterns of the third exposure method.
Figure 30B:
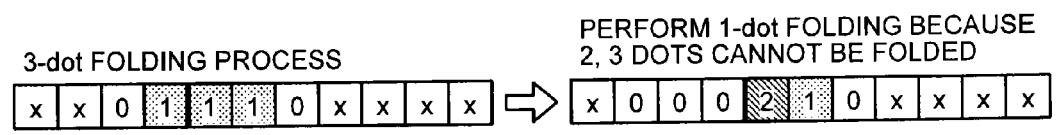

FIGS. 30A and 30B are schematic diagrams illustrating other examples of light power value addition processes for the exposure patterns in the third exposure method.

FIG. 30A illustrates an example of the addition of a 3-dot folding process. In addition, FIG. 30B illustrates another example of the addition of the 3-dot folding process.

As illustrated in FIGS. 30A and 30B, in the exposure method according to the embodiment, unlike the above-described addition process of exposure pixels which are symmetrically arrayed, even in the case where the exposure pixels do not exist at the corresponding positions when the folding is performed about a virtual symmetric axis, the addition process can be performed.

That is, in the exposure method according to the embodiment, when the addition process is to be performed, in the case where the exposure pixels of the adding side are already the pixels after the addition of the light power value, the addition process may be performed only on the exposure pixels on which the addition can be performed.

More specifically, as illustrated in FIGS. 30A and 30B, in the case where 3-dot folding cannot be performed in the 3-dot process mode, a process of adding only two dots or a process of adding only one dot can be performed.

By performing such a process, according to the exposure method according to the embodiment, even in the case where the number of exposure pixels on which the addition process according to the folding is to be performed is set to large, without changing the exposure pattern depending on the non-exposure portion, the images of various shapes can be formed as print materials having a high image quality.

Figure 31:
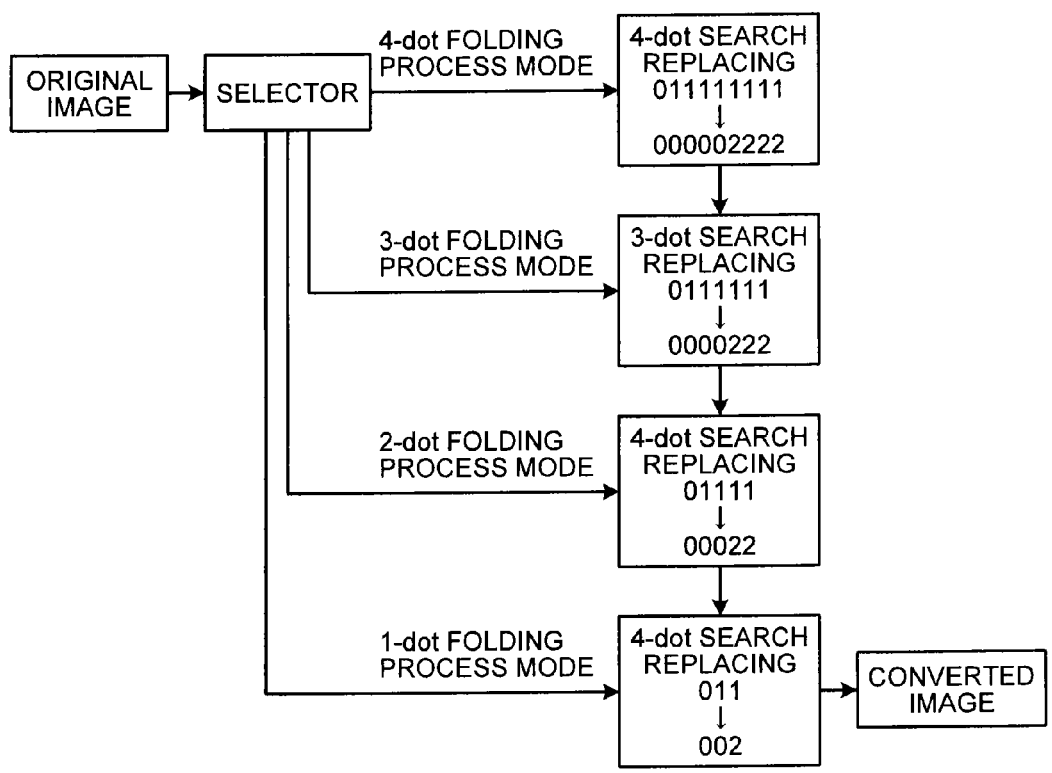
FIG. 31 is a block diagram illustrating the third exposure method.

FIG. 31 is a block diagram illustrating a third exposure method. As illustrated in the figure, in the exposure method according to the embodiment, the light source modulation data generating circuit 407 which receives the image data (original image) generated by an information processing device or the like selects which of any one of 4-dot to 1-dot folding process modes is to be performed, by a selector.

In the case of the 4-dot folding process mode, the light source modulation data generating circuit 407 performs a conversion process of performing searching with respect to whether or not 4 dots can be folded through pattern matching and performing the 4-dot folding when matched.

After the searching through the pattern matching by the 4-dot folding process mode is ended, the light source modulation data generating circuit 407 performs a conversion process of performing searching with respect to whether or not 3-dot folding can be performed through pattern matching and performing the 3-dot folding when matched. The light source modulation data generating circuit 407 sequentially performs such processes up to the 1-dot folding process mode.

Here, in the case where the 2-dot folding process mode is applied, the light source modulation data generating circuit 407 performs searching with respect to whether or not the 2-dot folding can be performed by the selector without performing the processes of the 4-dot and 3-dot folding process modes. In the case where the 2-dot folding can be performed, the light source modulation data generating circuit 407 performs a conversion process of performing the 2-dot folding.

By doing so, in the exposure method according to the embodiment, the 1-dot to 4-dot folding process modes can be performed by one determination process.

As described heretofore, according to the exposure method according to the embodiment, the pattern matching is performed in the above-described conditions and the light power value addition process is performed, so that the pixels which are added with the light power values can be appropriately processed so as not to be added again.

In addition, in the image forming method according to the present invention, at least two types of image qualities of a first image quality (normal image quality mode) and a second image quality may be allowed to be selected. Here, the first image quality is an image quality obtained by exposing the entire pixels of the image portion with a target exposure output value for a target exposure time. In addition, the second image quality is an image quality obtained by exposing at least a group of pixels existing at the boundary with respect to the non-exposure portion among the pixels constituting the pixels of the image portion with the light power value higher than the first light power value by using the exposure pattern according to the above-described embodiment.

Example of Formation of Character Image

Next, an example of application of the exposure method according to the embodiment to a micro-sized (three-point) character image will be described.

Figure 32A:
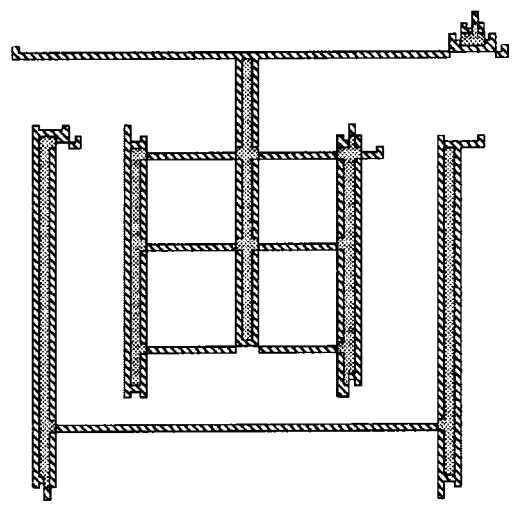
FIGS. 32A and 32B are schematic diagrams illustrating exposure patterns of character images according to the exposure method of the embodiment.
Figure 32B:
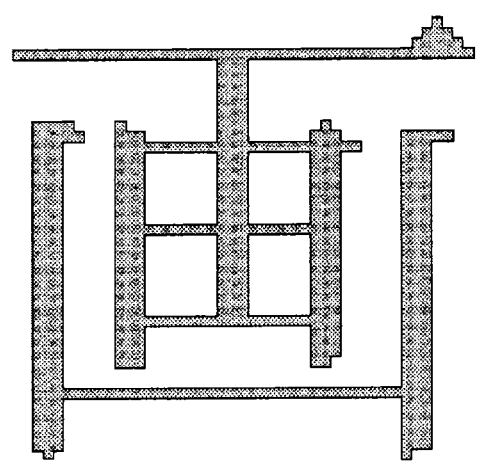

FIGS. 32A and 32B are schematic diagrams illustrating exposure patterns of character images according to the exposure method of the embodiment. FIG. 32A illustrates an exposure pattern obtained by performing the exposure in the state where two dots existing at the boundary between the image portion and the non-image portion are set to be the non-exposure portion and two dots existing at the boundary between the exposure portion and the non-exposure portion are set to be the high power exposure pixel group. In addition, FIG. 32B illustrates an exposure pattern of a Chinese character "画" which is exposed according to the standard exposure.

Figure 33A:
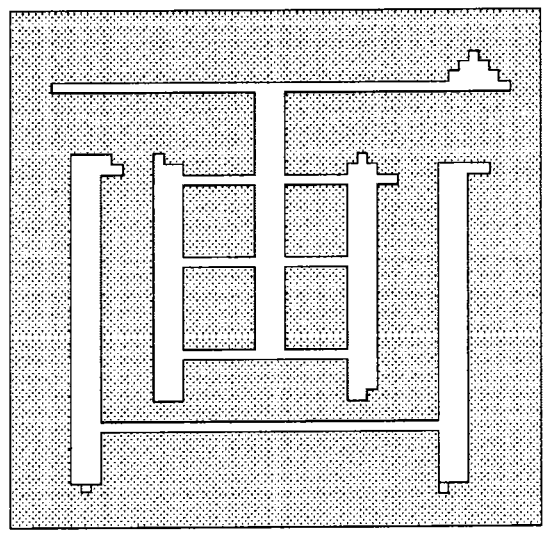
FIGS. 33A and 33B are schematic diagrams illustrating exposure patterns of outline character images according to the exposure method of the embodiment.
Figure 33B:
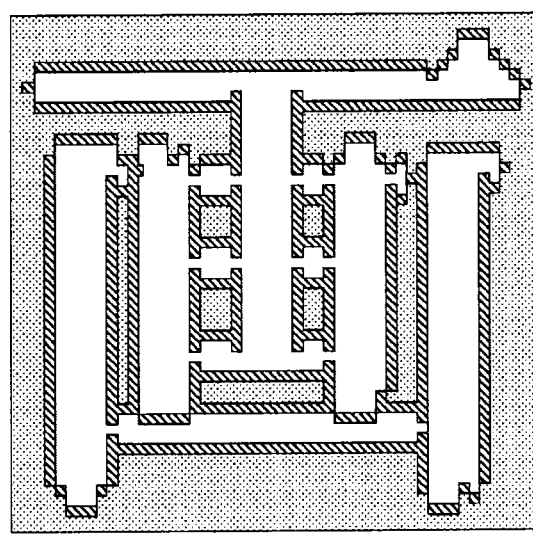

FIGS. 33A and 33B are schematic diagrams illustrating exposure patterns of outline character images according to the exposure method of the embodiment. FIG. 33A illustrates an outline exposure pattern of a Chinese character "画" which is exposed according to the standard exposure. In addition, FIG. 33B illustrates an exposure pattern obtained by performing the exposure in the state where four dots existing at the boundary between the image portion and the non-image portion are set to be the non-exposure portion and four dots existing at the boundary between the exposure portion and the non-exposure portion are set to be the high power exposure pixel group.

As illustrated in FIGS. 32A, 32B, 33A and 33B, the exposure method according to the embodiment can be applied to color reversed characters (outline characters) as well as normal colored characters.

That is, according to the exposure method according to the embodiment, when the image data are converted into the light source modulation data, even in the case where object information cannot be obtained from the information processing device, the exposure patterns of various images such as a character image, an reversed character image, a dither, and a line image can be generated.

In addition, in the exposure method according to the embodiment, the effect can be enhanced by selecting the folding process modes for the exposure pattern according to the characteristics of the image pattern.

In general, since the periphery of the void and reversed characters illustrated in FIGS. 33A and 33B is influenced by the exposure, the electric field intensity of the white background is reduced, so that the white background can be easily buried in the colored portion. For this reason, in the exposure method according to the embodiment, it is preferable that the light power value according to the time concentration exposure be increased by setting the number of pixels of the high power exposure pixel group and the non-exposure portion to be large.

In addition, in the exposure method according to the embodiment, in the dither portion such as halftone, in the case where textures or artifacts occur due to influence with other processes, the number of pixels in the high power exposure pixel group and the non-exposure portion may be reduced. When the number of pixels which are to be added is one dot, there is almost no disadvantage according to the exposure method according to the embodiment, and the effect of reduction in weak electric field can be obtained.

For this reason, in the exposure method according to the embodiment, in the case where a black character, a white character, or dither can be identified by using tag information identifying a type (character or line) of an object on which the addition process for the high power exposure pixel group is to be performed, the number of pixels in the high power exposure pixel group and the non-exposure portion can be appropriately arranged.

As a specific example, in the case of a normal character or line image, pixels existing at the boundary between the image portion and the non-image portion are attached with a tag in advance. On the other hand, in the case of a reversed character or reversed line image, pixels existing at the boundary between the image portion and the non-image portion are attached with a tag, and with respect to dither or others are treated in the same manner as the case where dither is not applied.

Therefore, in each image attached with the tag, a black character or a black line is set to the 3-dot folding process mode, an outline character or an outline line is set to the 4-dot folding process mode, and a dither is set to the 2-dot folding process mode in advance, for example.

First, the light source modulation data generating circuit 407 described in FIG. 10 detects the boundary pixel between the image portion and the non-image portion of the exposure pattern and determines from a tag bit of the boundary pixel (information specifying an attribute of an image pattern) of the boundary pixel whether the tag is zero or one.

Here, in the case where the tag bit is one, the light source modulation data generating circuit 407 determines that the image is a black character or a black line and performs the 3-dot folding process mode.

Next, in the case where the tag bit is zero, light source modulation data generating circuit 407 determines that the image is a white character or a white line and performs the 4-dot folding process mode.

In the case where the tag bit is neither zero nor one, the light source modulation data generating circuit 407 determines that the image is a dither portion and performs the 2-dot folding process mode.

In this manner, in the exposure method according to the embodiment, based on the information such as an image pattern of a received image or a tag bit of the image supplied from the controller, it is recognized whether the image is a normal character, a reversed character, or a dither portion and the optimal number of folded pixels according to each image is set.

That is, according to the exposure method according to the embodiment, since the light power value of the time concentration exposure can be made stronger or weaker, it is possible to provide an optimal image capable of showing the best performance of the image forming apparatus.

Configuration of Electrostatic Latent Image Measurement Device

Next, a configuration of the electrostatic latent image measurement device capable of checking an electrostatic latent image state formed by the exposure method according to the embodiment will be described.

FIG. 34 is a central circuit diagram illustrating the electrostatic latent image measurement device.

The electrostatic latent image measurement device 300 includes a charged particle irradiation system 400, an optical scanning device 1010, a sample stage 401, a detector 402, an LED 403, a control system (not illustrated), an ejection system (not illustrated), and a driving power source (not illustrated).

The charged particle irradiation system 400 is disposed inside a vacuum chamber 340. Here, the charged particle irradiation system 400 includes an electron gun 311, an extraction electrode 312, an acceleration electrode 313, a condenser lens 314, a beam blanker 315, and a partition plate 316. In addition, the charged particle irradiation system 400 includes a movable aperture stop 317, a stigmator 318, a scanning lens 319, and an objective lens 320.

In addition, in the description hereinafter, the optical axis direction of each lens is described as a c-axis direction, and two directions perpendicular to each other in the plane perpendicular to the c-axis direction are described as an a-axis direction and a b-axis direction.

The electron gun 311 generates an electron beam as a charged particle beam.

The extraction electrode 312 is disposed in the −c direction from the electron gun 311 to control the electron beam generated by the electron gun 311.

The acceleration electrode 313 is disposed in the −c direction from the extraction electrode 312 to control energy of the electron beam.

The condenser lens 314 is disposed in the −c direction from the acceleration electrode 313 to converge the electron beam.

The beam blanker 315 is disposed in the −c direction from the condenser lens 314 to turn on/off the electron beam irradiation.

The partition plate 316 is disposed in the −c direction from the beam blanker 315 and has an opening at the center thereof.

The movable aperture stop 317 is disposed in the −c direction from the partition plate 316 to adjust a beam diameter of the electron beam that has passed through the opening of the partition plate 316.

The stigmator 318 is disposed in the −c direction from the movable aperture stop 317 to correct astigmatism.

The scanning lens 319 is disposed in the −c direction from the stigmator 318 to deflect the electron beam that has passed through the stigmator 318, in an ab plane.

The objective lens 320 is disposed in the −c direction from the scanning lens 319 to converge the electron beam that has passed through the scanning lens 319. The electron beam that has passed through the objective lens 320 passes through a beam emitting opening portion 321 and irradiates a surface of the sample 323.

Each lens or the like is connected to the driving power source (not illustrated).

In addition, the charged particles denote particles influenced by an electric field or a magnetic field. Here, as the beam of irradiating the charged particles, for example, ion beams may be used instead of the electron beam. In this case, a liquid metal ion gun or the like is used instead of the electron gun.

The sample 323 is a photoconductor and includes a conductive supporting body, a charge generation layer (CGL) and a charge transport layer (CTL).

The charge generation layer includes a charge generation material (CGM) and is formed in a surface of the +c side of the conductive supporting body. The charge transport layer is formed in the surface of the +c side of the charge generation layer.

When the sample 323 is exposed in the state where the surface (surface in the +c side) is charged, light is absorbed by the charge generation material of the charge generation layer, so that charge carriers having two polarities of positive and negative polarities are generated. Due to the electric field, some of the carriers are injected to the charge transport layer, and others thereof are injected to the conductive supporting body.

Due to the electric field, the carriers injected to the charge transport layer are moved to the surface of the charge transport layer and are coupled with the charges of the surface to disappear. Accordingly, on the surface (surface in the +c side) of the sample 323, a charge distribution, that is, an electrostatic latent image is formed.

The optical scanning device 1010 includes a light source, a coupling lens, an opening plate, a cylindrical lens, a polygon mirror, and a scanning optical system. In addition, the optical scanning device 1010 also includes a scanning mechanism (not illustrated) for scanning the light with respect to the direction parallel to the rotation axis of the polygon mirror.

The surface of the sample 323 is irradiated with the light emitted from the optical scanning device 1010 through a reflecting mirror 372 and a window glass 368.

On the surface of the sample 323, the irradiation position of the light emitted from the optical scanning device 1010 is varied in the two directions perpendicular to each other on the plane perpendicular to the c-axis direction due to deflection in the polygon mirror and deflection in the scanning mechanism. At this time, the varying direction of the irradiation position due to the deflection in the polygon mirror is the main-scanning direction, and the varying direction of the irradiation position due to the deflection in the scanning mechanism is the sub-scanning direction. Here, the a-axis direction is set as the main-scanning direction, and the b-axis direction is set as the sub-scanning direction.

In this manner, the electrostatic latent image measurement device 300 can two-dimensionally scan the surface of the sample 323 with the light emitted from the optical scanning device 1010. That is, the electrostatic latent image measurement device 300 can form a two-dimensional electrostatic latent image on the surface of the sample 323.

Incidentally, the optical scanning device 1010 is installed outside the vacuum chamber 340 so that vibration or electromagnetic waves generated by a driving motor of the polygon mirror does not influence a trajectory of the electron beam. Therefore, the influence of disturbance on the measurement result can be suppressed.

The detector 402 is disposed in the vicinity of the sample 323 to detect secondary electrons of the sample 323.

The LED 403 is disposed in the vicinity of the sample 323 to emit light for illumination of the sample 323. The LED 403 is used to erase the charges remaining on the surface of the sample 323 after the measurement.

In addition, an optical housing retaining the scanning optical system may be constructed to cover the entire scanning optical system so as to block external light (harmful light) incident into the vacuum chamber.

In the scanning optical system, the scanning lens has fθ characteristics, and when an optical polarizer is rotated at a certain speed, the light beam is designed to be moved at a substantially constant speed with respect to an image plane.

In addition, in the scanning optical system, the beam spot diameter is also designed to be substantially constant during the scanning.

In the electrostatic latent image measurement device 300, since the scanning optical system is disposed to be separated from the vacuum chamber, there is small influence of direct propagation of the vibration generated from the driving of an optical deflector such as a polygon type scanner to the vacuum chamber 340.

In addition, it is possible to obtain higher anti-vibration effect by installing anti-vibration measures such as a damper to a structure (not illustrated) for retaining the scanning optical system.

In the electrostatic latent image measurement device 300, by installing the scanning optical system, any arbitrary latent image pattern including a line pattern can be formed in a generating line direction of the photoconductor.

In addition, in order to form a latent image pattern at a predetermined position, the synchronization detection sensor 26 for sensing a scanning beam of an optical deflecting unit may be installed.

In addition, the shape of the sample may be a planar surface or a curved surface.

Electrostatic Latent Image Measurement Method

Next, an electrostatic latent image measurement method will be described.

Figure 35:
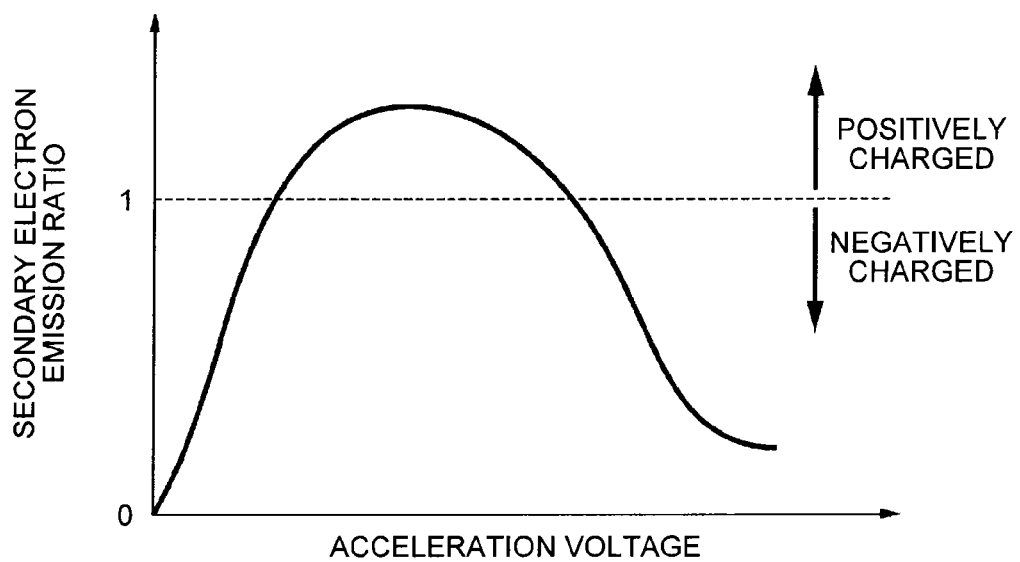
FIG. 35 is a schematic diagram illustrating a relationship between an acceleration voltage and charging.

FIG. 35 is a schematic diagram illustrating a relationship between the acceleration voltage and the charging. First, during the electrostatic latent image measurement, in the electrostatic latent image measurement device 300, the sample 323 of the photoconductor is irradiated with the electron beam.

As illustrated in FIG. 35, as the acceleration voltage |Vacc| which is the voltage applied to the acceleration electrode 313, a voltage higher than the voltage in which a secondary electron emission ratio of the sample 323 becomes one is set. By setting the acceleration voltage in this manner, since the amount of the incident electrons is larger than the amount of the emission electrons in the sample 323, the electrons are accumulated in the sample 323, so that charge-up occurs. As a result, in the electrostatic latent image measurement device 300, the surface of the sample 323 can be charged uniformly with negative charges.

Figure 36:
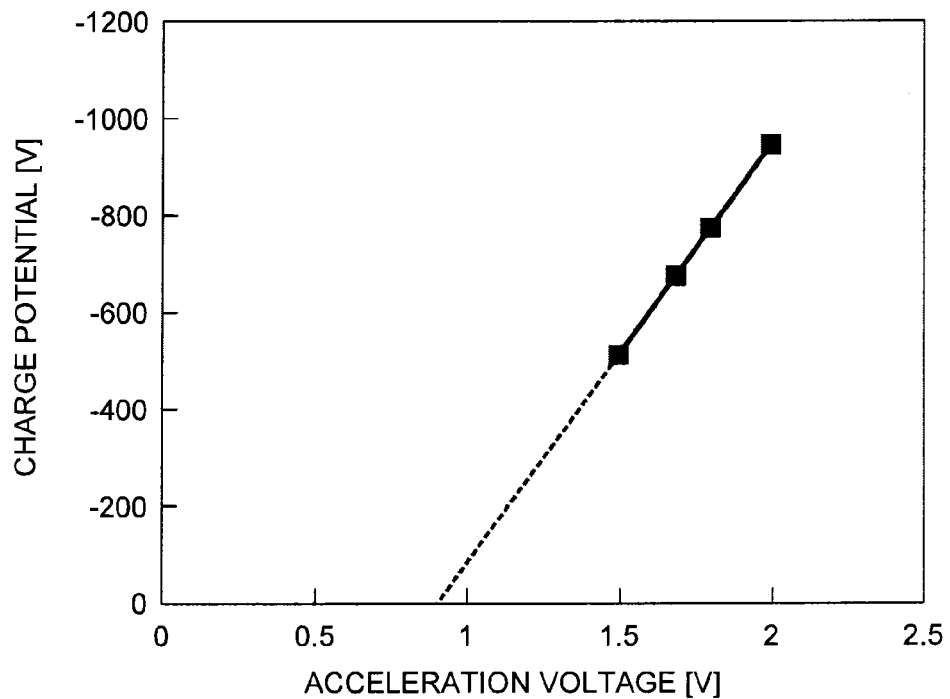
FIG. 36 is a graph illustrating a relationship between the acceleration voltage and a charge potential.

FIG. 36 is a graph illustrating a relationship between the acceleration voltage and the charge potential. As illustrated in the figure, there is a certain relationship between the acceleration voltage and the charge potential. For this reason, in the electrostatic latent image measurement device 300, by appropriately setting the acceleration voltage and the irradiation time, the same charge potential as that of the photoconductor drum 1030 in the image forming apparatus 1000 can be formed on the surface of the sample 323.

Incidentally, as an irradiation current is large, a target charge potential can be achieved in a short time. Therefore, in this case, the irradiation current is set to be several nano amperes (nA).

After that, in the electrostatic latent image measurement device 300, the amount of electrons which are incident on the sample 323 is set to $1/100$ times to $1/1000$ times so that the electrostatic latent image can be observed.

The electrostatic latent image measurement device 300 two-dimensionally performs optical scanning on the surface of the sample 323 by controlling the optical scanning device 500 and forms the electrostatic latent image on the sample 323. In addition, the optical scanning device 500 is controlled such that the light spot having a desired beam diameter and beam profile is formed on the surface of the sample 323.

By the way, although the exposure energy necessary for forming the electrostatic latent image is defined according to the sensitivity characteristics of the sample, the exposure energy is typically about 2 to 10 $mJ/m^2$. In addition, in some cases, in the case of a sample of lowsensitivity, the necessary exposure energy is 10 $mJ/m^2$ or more. That is, the charge potential or the necessary exposure energy is set in accordance with the photosensitivity characteristics of the sample or the process conditions. Here, the exposure conditions of the electrostatic latent image measurement device 300 are set to be the same as the exposure conditions in accordance with the image forming apparatus 1000.

Therefore, in such a case, the environment of electrostatic field or the trajectory of electrons is calculated in advance, and the detection result is corrected based on the calculation result, so that it is possible to obtain a profile of the electrostatic latent image at a high accuracy.

As described above, by using the electrostatic latent image measurement device 300, it is possible to obtain a charge distribution of an electrostatic latent image, a surface potential distribution, an electric field intensity distribution, and an electric field intensity in the direction perpendicular to the sample surface at the respective high accuracies.

Effect

As described above, according to the exposure method according to the embodiment, the following effects can be obtained.

According to the exposure method according to the embodiment, by performing the time concentration exposure (TC exposure) where the exposure is performed with a strong light power for a short time, it is possible to obtain the effect equivalent to the effect of a spatial concentration exposure (reduction of the diameter of the beam). According to the exposure method according to the embodiment, since an electrostatic latent image which has a small area and a certain depth can be formed, it is possible to form a high-resolution image.

In addition, according to the exposure method according to the embodiment, it is possible to selectively use conditions such as exposure patterns according to an image or conditions of the environment.

In addition, in the exposure method according to the embodiment, the exposure pattern is concentrated on the inner side (central portion) of the input image data, and the exposure is performed with the light power value which is stronger than that of the standard exposure. Therefore, according to the exposure method according to the embodiment, even with respect to a micro-sized image pattern, an image complying with the target image with a desired image density can be output.

In addition, according to the exposure method according to the embodiment, by setting the pixels existing at the boundary between the image portion and the non-image portion to be the high power exposure pixel group and increasing the light power value of the pixels of the exposure portion, the time concentration exposure can be applied to various image patterns.

In addition, according to the exposure method according to the embodiment, in the case where the light power value of the high power exposure pixel group exceeds a predetermined maximum light power value, the light power is dispersed to the adjacent image portion pixels, and the exposure is performed. Therefore, according to the exposure method according to the embodiment, even in the case where the maximum light power value cannot be set to be high, the image density is maintained, so that it is possible to implement a high image quality.

In addition, in the exposure method according to the embodiment, the exposure is performed by converting the pixels of the image portion existing at the boundary between the image portion and the non-image portion into the non-exposure portion and, simultaneously, by adding the light power value comparable to the non-exposure portion to the pixels of the image portion adjacent to the high power exposure pixel group. By doing so, according to the exposure method according to the embodiment, the time concentration exposure can be applied to various image patterns such as a character image, a reversed character image, a dither, and a line image.

In addition, according to the exposure method according to the embodiment, since the light power value is not added in the case where the light power value of the high power exposure pixel group exceeds the maximum light power value, an exception process does not need to be performed so that the time concentration exposure can be applied to various images with a simple, easy process.

In addition, according to the exposure method according to the embodiment, it is possible to perform the time concentration exposure in optimal conditions, since the process only for the number of pixels on which addition can be performed is performed in the case where, when the light power value is to be added to the high power exposure pixel group, the high power exposure pixel group is already added with the light power value.

In addition, in the exposure method according to the embodiment, the light source modulation data generating circuit 407 recognizes the image state based on information such as a tag bit supplied from the image processing circuit or the controller and sets the optimal number of folding pixels according to each image. Therefore, according to the exposure method according to the embodiment, it is possible to provide an optimal image capable of showing the best performance of the image forming apparatus.

Particularly, according to the exposure method according to the embodiment, at the places such as a dither portion where the image patterns are adjacent to each other and there are many areas where the latent image electric field is easily weakened, the weak electric field area is reduced, so that it is possible to improve dot reproducibility.

In addition, according to the exposure method according to the embodiment, since the image quality in the electrostatic latent image stage is improved, a high image quality can be stably realized in the micro-sized character image, particularly, the reversed character image.

In addition, according to the exposure method according to the embodiment, since the method is simple and easy, the method can be performed on various images at a high speed.

In addition, according to the exposure method according to the embodiment, since the integrated light amount of the standard exposure and the integrated light amount of the time concentration exposure can be equal to each other by intentionally strengthening the maximum light power value by using PM+PWM modulation, it is possible to increase a resolution by forming a deep latent image.

In addition, according to the image forming apparatus according to the embodiment, the exposure method according to the embodiment is visualized by developing, so that it is possible to provide an image forming apparatus having a high density and a high image quality.

The image forming apparatus according to the embodiment is appropriate for an image forming apparatus including a multi-beam scanning optical system, particularly, VCSEL or the like.

According to an embodiment, it is possible to form a high-quality image by an image pattern including an image portion composed of a plurality of pixels and a non-image portion.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming method of forming an electrostatic latent image corresponding to an image pattern including an image portion and a non-image portion, the method comprising:
   providing an image bearer; and
   exposing a surface of the image bearer with light according to the image pattern, wherein
   the image portion includes a plurality of pixels,
   among the pixels constituting the image portion, at least a group of pixels existing at a boundary with respect to the non-image portion is set as a non-exposure pixel group, and
   among the pixels constituting the image portion, at least a group of pixels existing at a boundary with respect to the non-exposure pixel group is set as an increased power exposure pixel group where said exposing is performed with light having a light power value higher than a predetermined light power value required to expose the image portion.

2. The image forming method according to claim 1, wherein, among the pixels constituting the image portion, at least a portion of a group of pixels adjacent to the non-exposure pixel group and the increased power exposure pixel group is exposed with the predetermined light power value.

3. The image forming method according to claim 2, wherein at least a portion of a group of pixels adjacent to pixels existing at the boundary with respect to the non-image portion is exposed as the increased power exposure pixel group.

4. The image forming method according to claim 1, wherein the increased power exposure pixel group is exposed by adding a predetermined light power value required to expose that pixel group and a light power value required to expose the non-exposure pixel group.

5. The image forming method according to claim 1, wherein a light power value of the increased power exposure pixel group is set according to a number of adjacent non-exposure pixel groups.

6. The image forming method according to claim 1, wherein
   in the increased power exposure pixel group, a maximum light power value per pixel is set, and
   among the increased power exposure pixel group, a group of pixels adjacent to a group of pixels which exceed the maximum light power value is exposed with a predetermined light power value above the predetermined light power value required to expose the image portion.

7. The image forming method according to claim 6, wherein the group of pixels adjacent to the group of pixels which exceed the maximum light power value is exposed with the maximum light power value.

8. The image forming method according to claim 1, wherein the increased power exposure pixel group is exposed for a time shorter than a predetermined time.

9. The image forming method according to claim 1, wherein an integrated light amount of light exposing pixels which are exposed in the image portion is equal to an integrated light amount of light power values in a case where entire pixels constituting the image portion are exposed for a predetermined time with light of the predetermined light power value.

10. An image forming apparatus that exposes a surface of an image bearer with light according to an image pattern including an image portion and a non-image portion, comprising:
   circuitry configured to select one from at least two types of image qualities of an output, wherein
   the image portion includes a plurality of pixels,
   among the pixels constituting the image portion, at least a group of pixels existing at a boundary with respect to the non-image portion is set as a non-exposure pixel group,
   when a first image quality of the at least two types of image qualities is selected, a light power value to expose the image portion is set as a first light power value, and
   when a second image quality of the at least two types of image qualities is selected, among the pixels constituting the image portion, at least a group of pixels existing at a boundary with respect to the non-exposure pixel group is exposed with light having a second light power value higher than the first light power value.

11. A print material production method comprising:
   providing an image bearer; and
   exposing a surface of the image bearer with light according to an image pattern having an image portion and a non-image portion to form an electrostatic latent image corresponding to the image pattern, wherein
   the image portion includes a plurality of pixels, and
   in of forming the electrostatic latent image, among the pixels constituting the image portion, at least a group of pixels existing at a boundary with respect to the non-image portion is set as a non-exposure pixel group, and among the pixels constituting the image portion, at least a group of pixels existing at a boundary with respect to the non-exposure pixel group is set as an increased power exposure pixel group where said exposing is performed with light having a light power value higher than a predetermined light power value required to expose the image portion.

* * * * *